US008189665B2

(12) United States Patent
Morimoto et al.

(10) Patent No.: US 8,189,665 B2
(45) Date of Patent: May 29, 2012

(54) EDITING APPARATUS, EDITING METHOD, EDITING PROGRAM, AND EDITING SYSTEM

(75) Inventors: Naoki Morimoto, Tokyo (JP);
Kenichiro Aridome, Kanagawa (JP);
Yukio Isobe, Kanagawa (JP); Atsushi Mae, Kanagawa (JP)

(73) Assignee: Sony Corporation (JP)

(*) Notice: Subject to any disclaimer, the term of this patent is extended or adjusted under 35 U.S.C. 154(b) by 1089 days.

(21) Appl. No.: 12/083,180

(22) PCT Filed: Sep. 8, 2007

(86) PCT No.: PCT/JP2007/065882
§ 371 (c)(1),
(2), (4) Date: Apr. 3, 2008

(87) PCT Pub. No.: WO2008/018618
PCT Pub. Date: Feb. 14, 2008

(65) Prior Publication Data
US 2009/0136145 A1    May 28, 2009

(30) Foreign Application Priority Data
Aug. 10, 2006   (JP) .............................. P2006-219002

(51) Int. Cl.
*H04N 7/12* (2006.01)

(52) U.S. Cl. .............................. 375/240.12; 375/240.01

(58) Field of Classification Search ..... 375/204–204.29; 386/278, 81, 283
See application file for complete search history.

(56) References Cited

U.S. PATENT DOCUMENTS
6,256,451 B1    7/2001   Mitsui
(Continued)

FOREIGN PATENT DOCUMENTS
EP              0 935 395 A2    8/1999
(Continued)

OTHER PUBLICATIONS
Yoneyama A et al: "A Fast Frame-Accurate H. 2641MPEG-4 AVC Editing Method" IEEE International Conference on Multimedia and Expo, 2005. ICME 2005. Amsterdam, The Netherlands, Jul. 6-8, 2005, IEEE, Piscataway, NJ USA LNKD-D0I:10.1109/ICME.2005. 1521667, Jul. 6, 2005, pp. 1298-1301, XP010843904 ISBN:978-0/7803-9331-8.
(Continued)

*Primary Examiner* — Chi Pham
*Assistant Examiner* — Feben M Haile
(74) *Attorney, Agent, or Firm* — Lerner, David, Littenberg, Krumholz & Mentlik, LLP

(57) ABSTRACT

An editing process is to be properly performed for video data that have been compression-encoded using inter-frame compression. Identification information that identifies a device that has recorded the stream file is extracted from the stream file that stores the video stream to be edited. When the extracted identification information represents a device that can encode the video stream with the same attribute as an attribute that the encoder of the editing apparatus can handle, an editing process is performed on the basis of a technique of decoding only a necessarily minimum region and re-encoding it. Otherwise, the editing process is performed on the basis of a technique of encoding all a video stream to be edited and re-encoding it. It can be determined whether or not the encoding process on the basis of the technique of decoding only a necessarily minimum region can be performed on the basis of only predetermined identification information contained in the video stream.

8 Claims, 17 Drawing Sheets

U.S. PATENT DOCUMENTS

| | | |
|---|---|---|
| 7,113,542 B2 * | 9/2006 | Tanaka ..................... 375/240.01 |
| 2002/0097272 A1 | 7/2002 | Tanaka |
| 2005/0175321 A1 | 8/2005 | Aridome et al. |
| 2005/0254363 A1 | 11/2005 | Hamada et al. |
| 2006/0112124 A1 | 5/2006 | Ando et al. |
| 2009/0232470 A1 * | 9/2009 | Uchida ........................... 386/52 |

FOREIGN PATENT DOCUMENTS

| | | |
|---|---|---|
| JP | 11-196376 A | 7/1999 |
| JP | 11-289541 A | 10/1999 |
| JP | 2002218390 A | 8/2002 |
| JP | 2003-085877 A | 3/2003 |
| JP | 2004-328450 A | 11/2004 |
| JP | 2004-350251 A | 12/2004 |
| JP | 2006-109160 A | 4/2006 |

OTHER PUBLICATIONS

European Search Report 07792522, dated Apr. 26, 2010.

Office Action from Japanese Application No. 2006-219002, dated Nov. 30, 2010.

* cited by examiner

ACCESS UNIT

\* 1 : End Of Sequence
\* 2 : End Of Stream

Fig. 6

| SYNTAX | DATA LENGTH (BITS) | MNEMONIC |
|---|---|---|
| user_data_unregistered(payloadSize) { | | |
|   uuid_iso_iec_11578 | 128 | uimsbf |
|   type_indicator | 32 | uimsbf |
|   if ( type_indicator == 0x4741 3934 ) { | | |
|     cc_data() | | |
|   else if ( type_indicator == 0x4D44 504D ) { | | |
|   ModifiedDVPackMeta() { | | |
|     number_of_modified_dv_pack_entries | 8 | uimsbf |
|     for ( i=0; i<number_of_modified_dv_pack_entries; i++ ) { | | |
|       one_modified_dv_pack() { | | |
|         mdp_id | 8 | uimsbf |
|         mdp_data | 32 | bslbf |
|       } | | |
|     } | | |
|   } | | |
| } | | |

Fig. 7A

| SYNTAX | DATA LENGTH (BITS) | MNEMONIC |
|---|---|---|
| MAKER & MODEL ID pack() { | | |
| mdp_id | 8 | uimsbf |
| mdp_data { | | |
| maker_ID | 16 | uimsbf |
| maker_model_code | 16 | uimsbf |
| } | | |
| } | | |

Fig. 7B

| SYNTAX | DATA LENGTH (BITS) | MNEMONIC |
|---|---|---|
| MAKER OPTION pack() { | | |
| mdp_id | 8 | uimsbf |
| mdp_data { | | |
| REC_MODE | 32 | uimsbf |
| } | | |
| } | | |

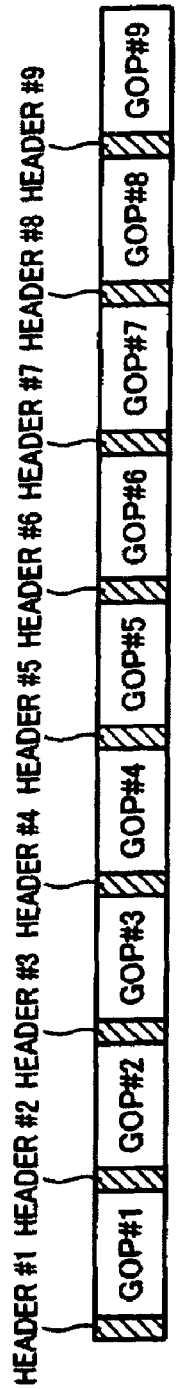
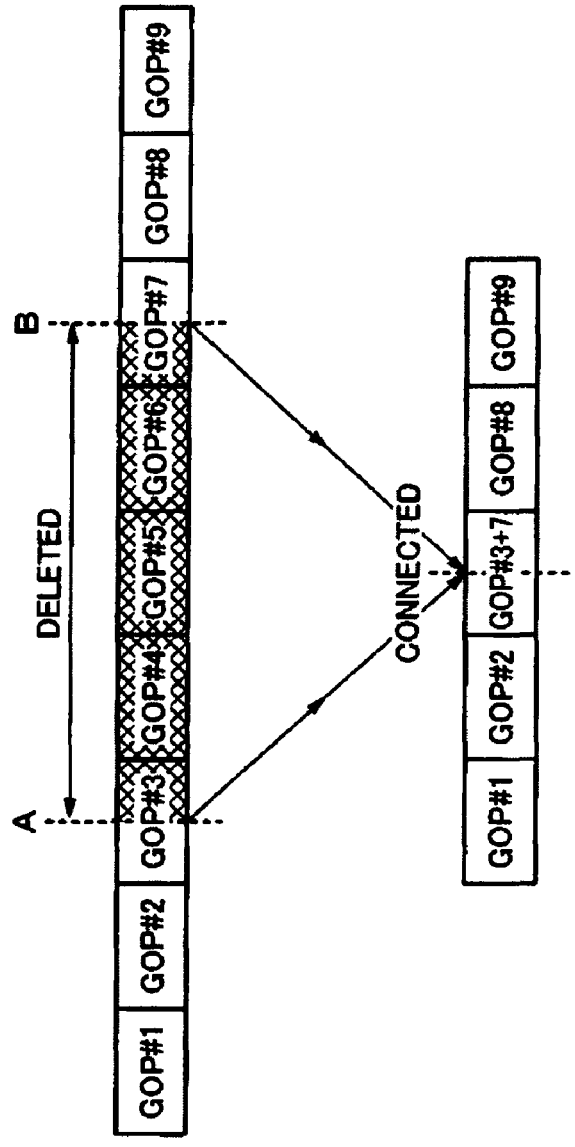
Fig. 8A
Fig. 8B
Fig. 8C

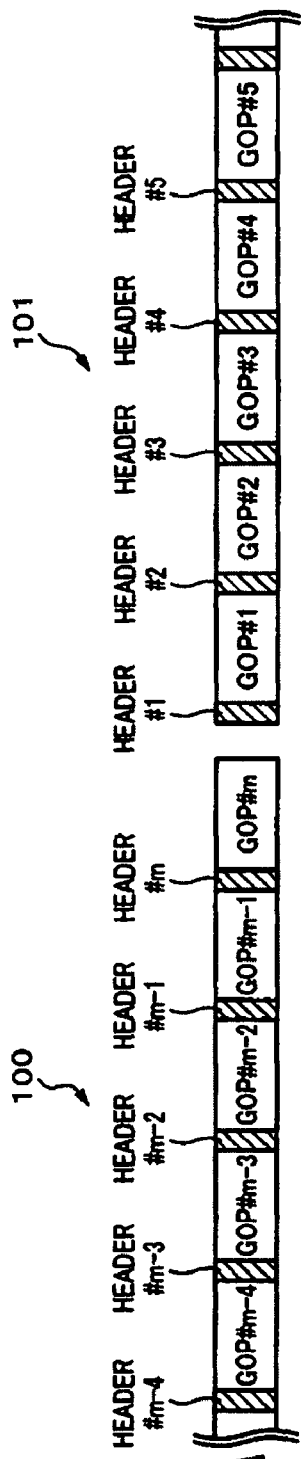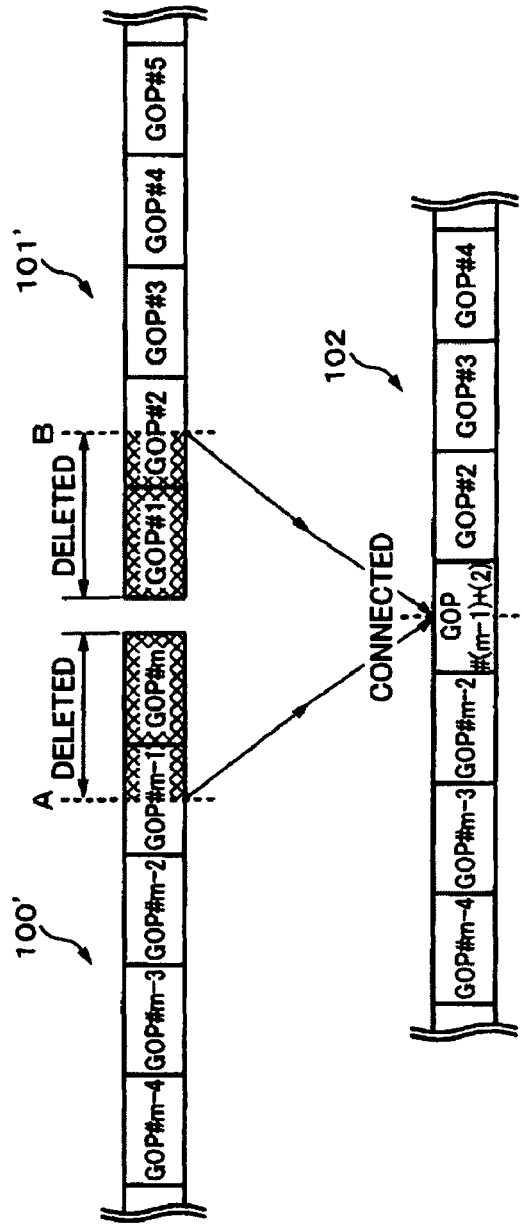
Fig. 12A
Fig. 12B
Fig. 12C

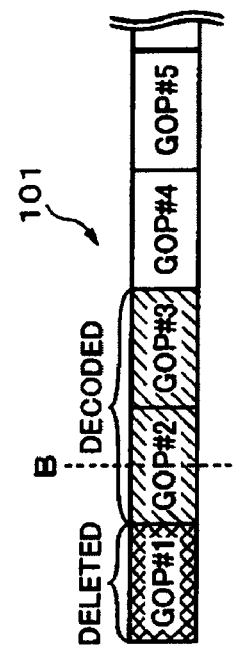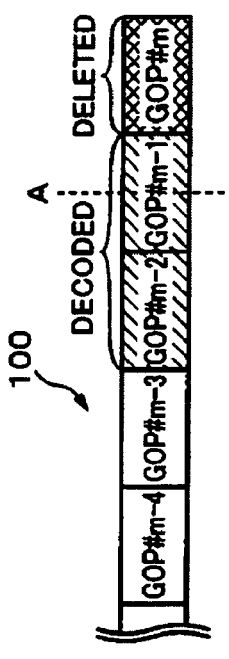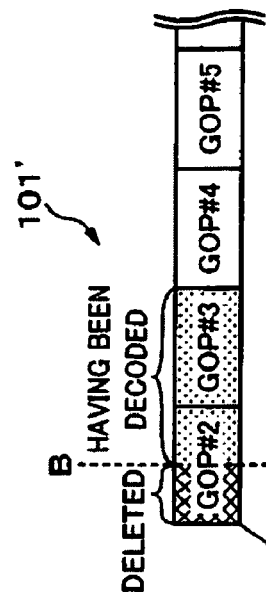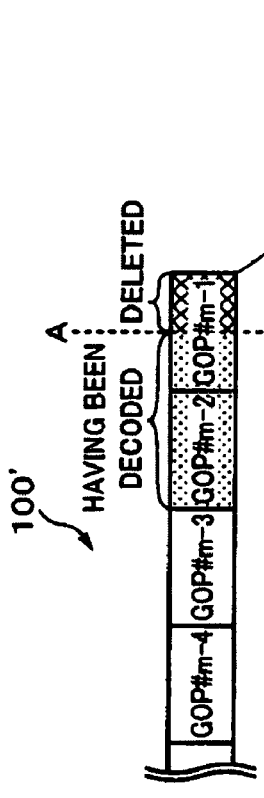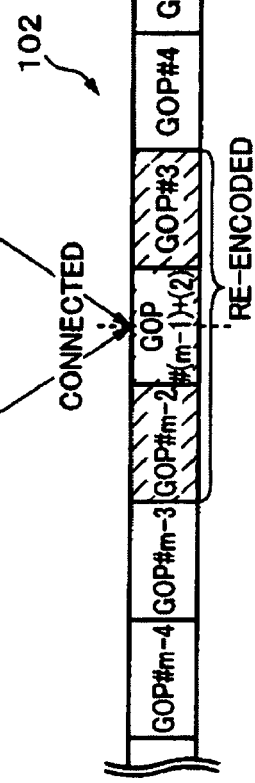
Fig. 13A  Fig. 13B  Fig. 13C

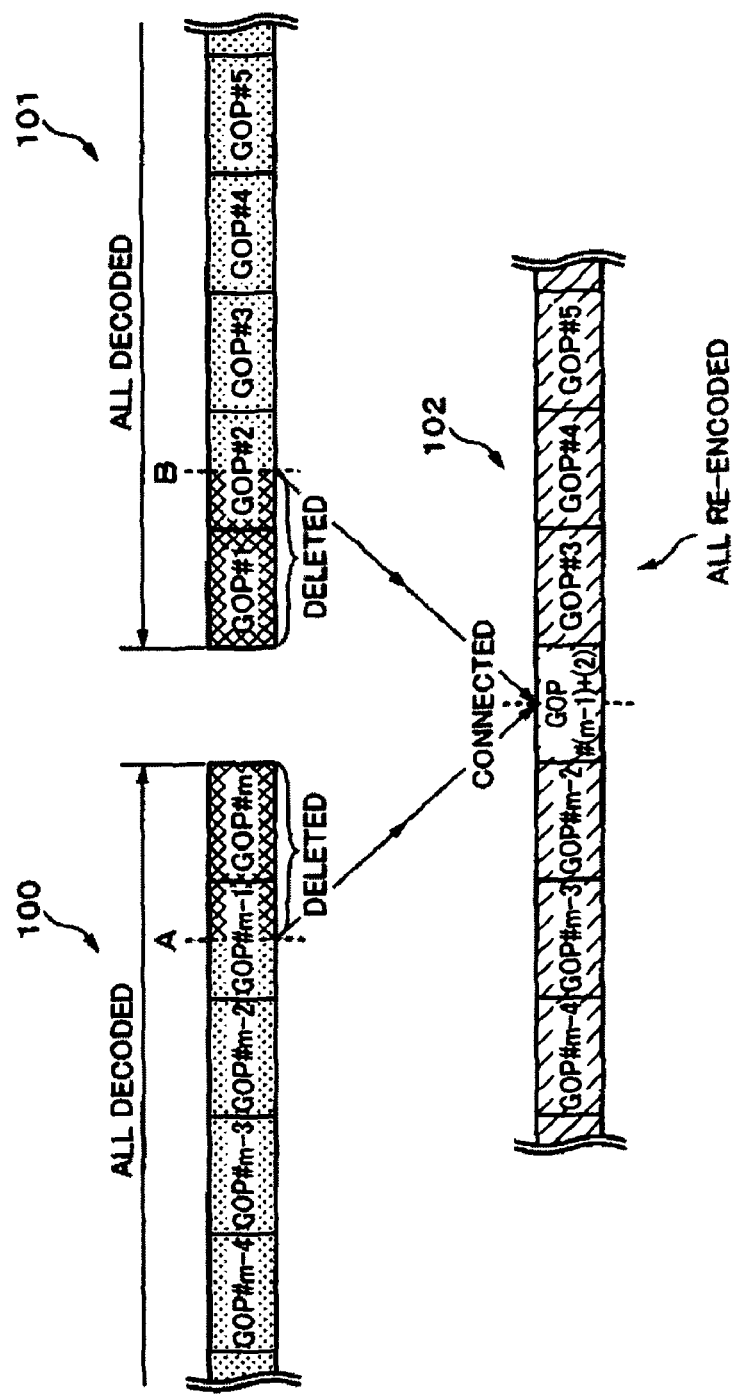

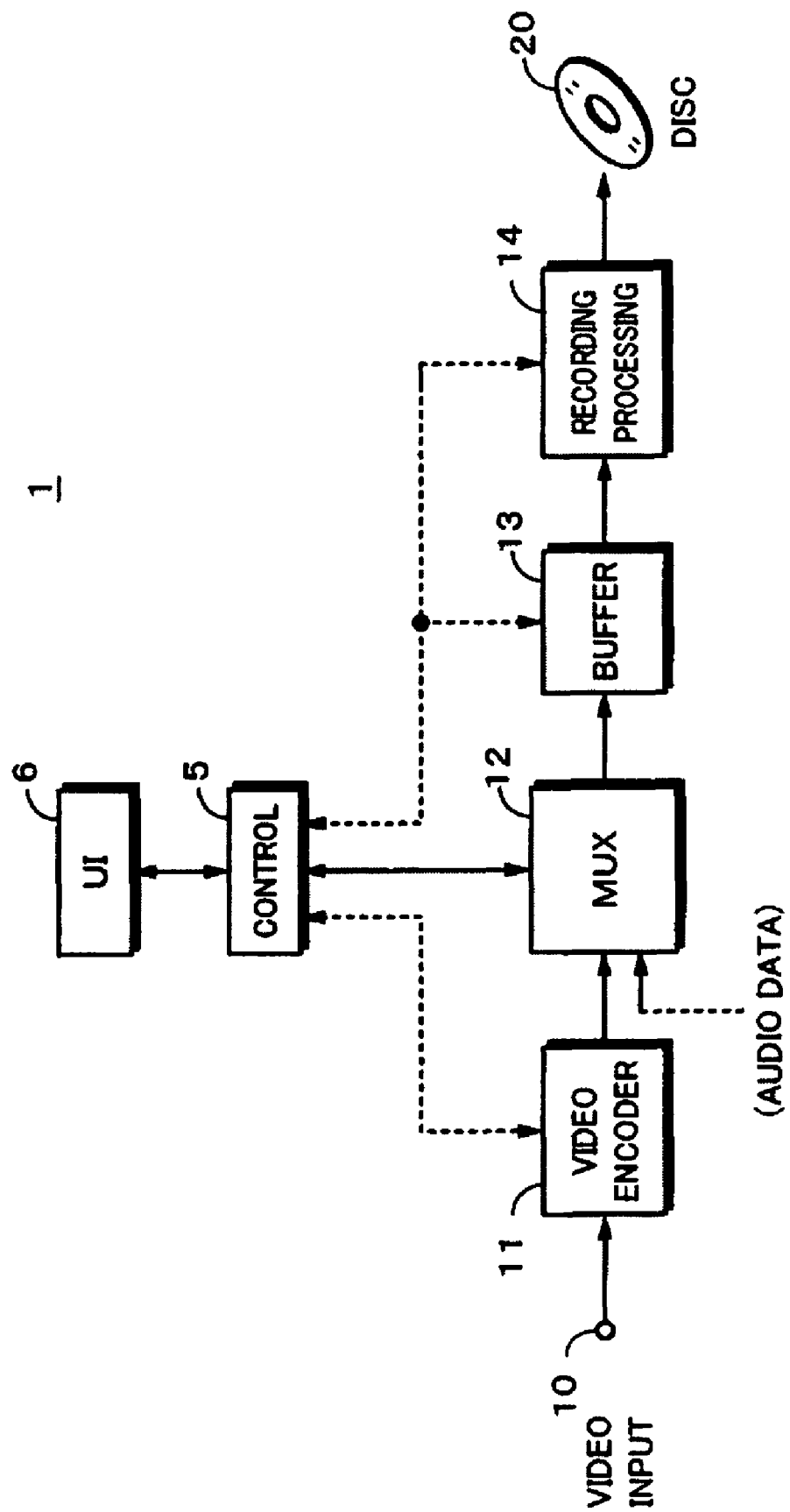

EDITING APPARATUS, EDITING METHOD, EDITING PROGRAM, AND EDITING SYSTEM

CROSS REFERENCE TO RELATED APPLICATIONS

The present application is a national phase entry under 35 U.S.C. §371 of International Application No. PCT/JP2007/065882 filed Aug. 8, 2007, published on Feb. 14, 2008 as WO 2008/018618 A1, which claims priority from Japanese Patent Application No. JP 2006-219002 filed in the Japanese Patent Office on Aug. 10, 2006.

BACKGROUND OF THE INVENTION

1. Field of the Invention

The present invention relates to an editing apparatus, an editing method, an editing program, and an editing system that allow video data that have been compression-encoded using inter-frame compression to be edited more quickly than before.

2. Desciption Of Related Art

As a record medium that is recordable and removable from a recoding and reproducing apparatus, that has a relatively large recording capacity, and that is suitable for recording AV (Audio/Video) data composed of video data and audio data, a DVD (Digital Versatile Disc) having a recording capacity of 4.7 GB (Giga Byte) or more has already become common. Patent document "Japanese Patent Application Laid-Open No. 2004-350251" describes an image capturing apparatus that records DVD-Video format data to a recordable type DVD.

Since this recordable type DVD uses UDF (Universal Disk Format) as a file system, a computer apparatus based on UDF can access this recordable type DVD. Since UDF contains ISO (International Organization for Standardization) 9660 based format, various types of file systems used for computer apparatus can access the recordable type DVD. When video data captured, for example, by an image capturing apparatus and audio data obtained together with the video data that are captured are recorded as a file to this recordable type DVD, since affinity of the image capturing apparatus to other apparatus such as computer apparatus increases, recorded data can be more effectively used.

Since the data amount of video data is huge, they are normally compression-encoded according to a predetermined system and then recorded to a record medium. As a standard compression-encoding system for video data, MPEG2 (Moving Picture Experts Group 2) system is known. In recent years, as advanced and highly effective encoding systems of the MPEG2 compression-encoding system, ITU-T (International Telecommunication Union-Telecommunication Standardization Sector) Recommendation H. 264 or ISO (International Organization for Standardization)/IEC (International Electrotechnical Commission) International Standard 14496-10 (MPEG-4 Part 10) Advanced Video Coding (hereinafter referred to as H. 264|AVC) is becoming common.

In these MPEG2 and H. 264|AVC, intra-frame encoding using orthogonal transform or the like is performed. In addition, inter-frame encoding according to prediction encoding using motion compensation is performed so as to improve the compression rate. Next, inter-frame compression according to prediction encoding for the MPEG2 system will be described.

First of all, the structure of a data stream according to MPEG2 will be outlined. MPEG2 is a combination of prediction encoding using motion compensation and compression encoding using DCT. Data of MPEG2 are hierarchically structured as the block layer, the macro block layer, the slice layer, the picture layer, the GOP layer, and the sequence layer in the ascending order. The block layer is composed of a DCT block that is the unit of DCT. The macro block layer is composed of a plurality of DCT blocks. The slice layer is composed of a header portion and at least one macro block. The picture layer is composed of a header portion and at least one slice. One picture corresponds to one screen. The boundaries of layers can be identified with identification codes.

The GOP layer is composed of a header portion, an I (Intra-coded) picture that is a picture based on intra-frame encoding and a P (Predictive-coded) picture and a B (Bi-directionally predictive coded) picture that are pictures based on prediction-encoding. An I picture can be decoded only with its own information. A P picture and a B picture need the immediately preceding picture as a reference picture and the immediately preceding and following pictures as reference pictures, respectively. Thus, a P picture and a B picture cannot be decoded by themselves. For example, a P picture is decoded with the chronologically immediately preceding I picture or P picture as a reference picture. On the other hand, a B picture is decoded with two pictures of the chronologically immediately preceding and following I picture(s) or B picture(s) as reference pictures. A group that contains at least one I picture and that is complete with itself is referred to as a GOP (Group Of Picture) and is an independently accessible minimum unit of an MPEG stream.

One GOP is composed of one or a plurality of pictures. In the following description, it is assumed that one GOP is composed of a plurality of pictures. There are two types of GOPs, a closed GOP that can be fully decoded by itself and an open GOP that can be decoded with information of the immediately preceding GOP. Since an open GOP can be decoded with more information than a closed GOP, the open GOP has a higher picture quality than the closed GOP and is generally used.

Next, with reference to FIG. 1A, FIG. 1B, and FIG. 1C, a decoding process for data that have been inter-frame compressed will be described. In this example, it is assumed that one GOP is composed of a total of 15 pictures of one I picture, four P pictures, and 10 B pictures and that the GOP type is the open GOP. As exemplified in FIG. 1A, I, P, and B pictures of the GOP are displayed in the order of "$B_0B_1I_2B_3B_4P_5B_6B_7P_8B_9B_{10}P_{11}B_{12}B_{13}P_{14}$". In this sequence, the suffixes represent the order in which pictures are displayed.

In this example, the first two $B_0$ and $B_1$ pictures are pictures that have been predicted and decoded with the last $P_{14}$ picture of the immediately preceding GOP and $I_2$ picture of the current GOP, respectively. The first $P_5$ picture of the current GOP is a picture predicted and decoded with $I_2$ picture. The other $P_8$ picture, $P_{11}$ picture, and $P_{14}$ are pictures that have been predicted and decoded with the immediately preceding P picture. Each B picture preceding the I picture is a picture that has been predicted and decoded with the immediately preceding and following I and/or P picture.

On the other hand, since a B picture is predicted and decoded with the chronologically preceding and following I or P picture, it is necessary to designate the order of I, P, and B pictures of a stream or a record medium taking into account of the decoding order in which the decoder decodes the pictures. In other words, an I and/or P picture that decodes a B picture needs to be always decoded before the B picture is decoded.

In the foregoing, as exemplified in FIG. 1B, pictures of a stream or a record medium are arranged in the order of "$I_2B_0B_1P_5B_3B_4P_8B_6B_7P_{11}B_9B_{10}P_{14}B_{12}B_{13}$" and they are input to the decoder in this order. In this sequence, the suffixes of the pictures shown in FIG. 1B correspond to those shown in FIG. 1A and represent the order in which the pictures are displayed.

As shown in FIG. 1C, in the decoding process of the decoder, first of all, $I_2$ picture is decoded and then $B_0$ picture and $B_1$ picture are predicted and decoded with the decoded $I_2$ picture and the last $P_{14}$ picture (in the display order) of the immediately preceding GOP. Thereafter, $B_0$ picture and $B_1$ picture are output from the decoder in the order of which they have been decoded and then $I_2$ picture is output. After $B_1$ picture is output, $P_5$ picture is predicted and decoded with $I_2$ picture. Thereafter, $B_3$ picture and $B_4$ picture are predicted and decoded with $I_2$ picture and $P_5$ picture. Thereafter, $B_3$ picture and $B_4$ picture that have been decoded are output from the decoder in the order of which they have been decoded and then $P_5$ picture is output.

Thereafter, likewise, processes of which a P or I picture that is used to predict a B picture is decoded before the B picture, the B picture is predicted and decoded with the decoded P or I picture, the decoded B picture is output, and the P or I picture used to decode the B picture is output are repeated. The arrangement of pictures of a record medium or a stream as shown in FIG. 1B is generally used.

In the H. 264|AVC system, the encoding process and the decoding process for video data are performed nearly in the same manner as those in the MPEG2 system. In the H. 264|AVC system, inter-frame prediction is more flexibly performed with pictures. In the H. 264|AVC system, a randomly accessible picture that is equivalent to an I picture in the MPEG2 system is referred to as an IDR (Instantaneous Decoding Refresh) picture. In the following, an encoding system will be described on the basis of the MPEG2 system.

Now, the case of which video data that have been compression-encoded according to an encoding system using inter-frame compression such as the MPEG2 system are edited is considered. As an exemplary editing process, the case of which scenes of a middle portion of a video program are deleted and the remaining portions are connected will be described. For example, as exemplified in FIG. 2A, region A-B as scenes to be deleted is designated in a video stream of a series of GOPs such as GOP #1, GOP #2, . . . , GOP #9, . . . . In this case, it is assumed that edit point A at the front end of region A-B and edit point B of the rear end of region A-B are a picture in the middle portion of GOP #3 and a picture in the middle portion of GOP #7, respectively. The video stream is edited in such a manner that pictures in the region A-B are deleted, edit point A and edit point B are connected, and thereby one edited video stream is obtained (refer to FIG. 2B).

When the video stream is edited in such a manner, if pictures in region A-B are simply deleted, the structure of GOP #3+7 that contains the connected portions is destroyed. As a result, a problem of which the video stream cannot be normally reproduced occurs. Thus, the video stream cannot be edited in the accuracy of one frame, but one GOP.

As an exemplary editing process performed in the unit of one GOP, a method of deleting GOP #4 to GOP #6 contained in region A-B to be deleted are deleted and the rear end of GOP #3 and the front end of GOP #7 are connected can be considered. However, when GOPs have the open GOP structure, this method causes a problem of which GOP #7 that precedes a GOP that is deleted cannot decode a group of B pictures (B picture$_0$ and $B_1$ picture in FIG. 1A, FIG. 1B, and FIG. 1C).

To solve the foregoing problem, a method of temporarily decoding a video stream to be edited, editing the video stream in the accuracy of one frame, and then decoding the edited stream can be considered. However, if processes of decoding all the video stream to be edited and then encoding the edited video stream are performed whenever the video stream is edited, it will take a long processing time. In contrast, if all the video stream that has been encoded is decoded and then re-encoded, the picture quality of all the video stream will deteriorate.

These problems also occur when a plurality of video streams are connected.

To solve these problems, so far, a technique of decoding only a necessarily minimum region near an edit point and then re-encoding the decoded region is known. In other words, only GOPs to be deleted and connected and those that are affected thereby are decoded and then re-encoded. Other GOPs are copied in the unit of one GOP. As a typical exemplary technique of which only a necessarily minimum region near an edit point is decoded and re-encoded, a technique called smart rendering is generally known.

Next, with reference to the foregoing FIG. 2A and FIG. 2B, an exemplary process of decoding only a necessarily minimum region near an edit point and then re-encoding the decoded region will be outlined. When region A-B designated by edit point A and edit point B is deleted, portions to be decoded on the edit point A side are GOP #3 containing edit point A and GOP #2 immediately preceding GOP #3. When these GOPs are open GOPs, GOP #2 immediately preceding GOP #3 containing edit point A is necessary to decode $B_0$ picture and $B_1$ picture at the front end in the display order of GOP #3. On the other hand, portions necessary to be decoded on the edit point B side are GOP #7 containing edit point B and GOP #8 immediately following GOP #7. When these GOPs are open GOPs, to decode a block of B pictures at the front end in the display order of GOP #8, it is necessary to use data of GOP #7.

In the state shown in FIG. 2A, first of all, GOP #4 to GOP #6 are deleted, GOP #2 and GOP #3 are decoded, and then GOP #7 and GOP #8 are decoded. In GOP #3, pictures immediately following edit point A are deleted from those that have been decoded. Likewise, in GOP #7, pictures immediately preceding edit point B are deleted from those that have been decoded. Thereafter, edit point A and edit point B are connected and newly created GOP #3+7 is re-encoded with reference to the code amounts of GOP #2 and GOP #8 immediately preceding and following GOP #3+7 (refer to FIG. 2B). $B_0$ picture and $B_1$ picture at the front end of GOP #3+7 are encoded with the last $P_{15}$ picture of the decoded GOP #2 and $I_3$ picture of the decoded GOP #3. GOP #2 and GOP 8 that have not been decoded can be stored in memory and they can be used.

These process can be applied to an editing process of connecting a plurality of video streams.

BRIEF SUMMARY OF THE INVENTION

When an editing process using the foregoing re-encoding is performed, video streams to be connected need to satisfy several restrictions. As described above, a video stream is stored in a file and recorded to a record medium. At this point, predetermined parameters with respect to a video stream recorded to one file need to be fixed in the file.

If video streams that have different values with respect to a particular parameter are connected to one video stream by an editing process, stored in one file, and the video stream stored in the file is reproduced by a reproducing device, there is a possibility of which the decoder of the reproducing device may not handle a change of the value of the attribute.

Examples of parameters whose values need to be fixed include frame sizes in the vertical direction and horizontal direction, aspect ratio (16:9, 4:3, or the like), frame rate (29.97 Hz, 59.94 Hz, or the like), frame structure, and presence/absence of data of closed caption. When video streams that are connected are re-encoded by an editing process, the values of each parameter of the video streams need to match each other.

When an editing apparatus can handle all these parameters, it can encode video streams with predetermined values of these attributes. However, in this case, the editing apparatus needs to handle all combinations of the values of the parameters prescribed in the format of the video streams. Thus, there are problems of which the scale of the encoder increases and its cost rises.

To solve these problems, it is contemplated that the editing apparatus side can edit video streams recorded only by a predetermined recording apparatus. When video streams to be edited are restricted, the editing apparatus side is necessary to handle only parameters that the recoding apparatus can handle. However, in this case, when a video stream recorded by another recording apparatus is supplied to this editing apparatus, there is a problem of which the editing apparatus likely malfunctions.

DISCLOSURE OF THE INVENTION

Therefore, an object of the present invention is to provide an editing apparatus, an editing method, an editing program, and an editing system that allow an editing process to be properly performed for video data that have been compression-encoded using inter-frame compression.

To solve the foregoing problem, a first aspect of the present invention is in an editing apparatus which edits video data which have been compression-encoded using inter-frame compression, characterized in that the editing apparatus comprises an input section to which a data stream composed of the video data that have been compression-encoded using the inter-frame compression is input; an extracting section which extracts identification information from the data stream, the identification information identifying a device which has created the data stream; a decoding section which decodes the data stream; an encoding section which encodes the video data with a predetermined attribute according to compression-encoding using the inter-frame compression; and an editing section which decodes and encodes the data stream based on an edit point that has been set to the data stream and edits the data stream based on the edit point, and the editing section determines whether or not the identification information extracted from the stream data by the extracting section represents a device which can encode the video data with an attribute identical to the predetermined attribute with which the encoding section encodes the data stream and when determined that the identification information represent the device, the editing section decodes and encodes a predetermined region including the edit point and edits the predetermined region.

In addition, a second aspect of the present invention is in an editing method of editing video data which have been compression-encoded using inter-frame compression, characterized in that the editing method comprises an extracting step of extracting identification information from a data stream composed of video data that have been compression-encoded using the inter-frame compression, the identification information identifying a device which has created the data stream; a decoding step of decoding the data stream; an encoding step of encoding the video data with a predetermined attribute according to compression-encoding using the inter-frame compression; and an editing step of decoding and encoding the data stream based on an edit point that has been set to the data stream and editing the data stream based on the edit point, and the editing step is performed by determining whether or not the identification information extracted from the stream data by the extracting section represents a device which can encode the video data with an attribute identical to the predetermined attribute with which the data stream is encoded at the encoding step and when determined that the identification information represent the device, the editing step is performed by decoding and encoding a predetermined region including the edit point and editing the predetermined region based on the edit point.

In addition, a third aspect of the present invention is in an editing program which causes a computer apparatus to execute an editing method of editing video data which have been compression-encoded using inter-frame compression, characterized in that the editing method comprises an extracting step of extracting identification information from a data stream composed of video data that have been compression-encoded using the inter-frame compression, the identification information identifying a device which has created the data stream; a decoding step of decoding the data stream; an encoding step of encoding the video data with a predetermined attribute according to compression-encoding using the inter-frame compression; and an editing step of decoding and encoding the data stream based on an edit point that has been set to the data stream and editing the data stream based on the edit point, and the editing step is performed by determining whether or not the identification information extracted from the stream data by the extracting section represents a device which can encode the video data with an attribute identical to the predetermined attribute with which the data stream is encoded at the encoding step and when determined that the identification information represent the device, the editing step is performed by decoding and encoding a predetermined region including the edit point and editing the predetermined region based on the edit point.

In addition, a fourth aspect of the present invention is in an editing system which compression-encodes video data using inter-frame compression, records the encoded video data to a record medium, and edits video data that have been compression-encoded using the inter-frame compression and that have been reproduced from the record medium, characterized in that the editing system comprises a recording apparatus which has a first encoding section which compression-encodes the video data using the inter-frame compression with a predetermined attribute and outputs the encoded video data as a data stream; and a recoding section which records the data stream which is output from the first encoding section as a stream file to the record medium, the recording apparatus recording the data stream to the record medium such that identification information which identifies a device is embedded in the data stream, and an editing apparatus which has a reproducing section which reads the stream file from the record medium and extracts the data stream from the stream file; an extracting section which extracts the identification information from the data stream; a decoding section which decodes the data stream; a second encoding section which encodes the video data according to compression encoding using the inter-frame compression with a predetermined attribute; and an editing section which decodes and encodes the data stream based on an edit point that has been set to the data stream and edits the predetermined region based on the edit point, the editing section determining whether or not the identification information extracted from the stream data by the extracting section represents a device that can encode the video data with an attribute identical to the predetermined attribute with which the second encoding section encodes the video data and when determined that the identification information represent the device, the editing section decodes and encodes a predetermined region including the edit point and edits the predetermined region based on the edit point.

As described above, according to the first, second, and third aspects of the present invention, identification information is extracted from a data stream composed of video data that have been compression-encoded using the inter-frame compression. The identification information identifies a device which has created the data stream. The data stream is encoded and decoded based on an edit point that has been set to the data stream and the data stream is edited based on the edit point. When the data stream is edited, it is determined whether or not the identification information extracted from the stream data by the extracting section represents a device which can encode the video data with an attribute identical to a predetermined attribute with which the data stream is encoded by encoding using inter-frame compression. When determined that the identification information represent the device, a predetermined region including the edit point is decoded and encoded and the predetermined region is edited based on the edit point. Thus, only by referring to the identification information that has been embedded in the data stream and that identifies the device which has created the data stream, it can be determined whether or not the predetermined region containing the edit point can be decoded and encoded and the predetermined region can be edited based on the edit point.

In addition, according to the fourth aspect of the present invention, a recording apparatus records a data stream of which video data has been compression-encoded using the inter-frame compression with a predetermined attribute and output as a stream file to a record medium. At this point, the recording apparatus records the data stream to the record medium such that identification information which identifies a device is embedded in the data stream. An editing apparatus reads the stream file from the record medium and extracts the data stream from the stream file, extracts the identification information from the data stream, decodes the data stream based on an edit point which has been set to the data stream, encodes the data stream according to compression encoding using inter-frame compression with a predetermined attribute, and edits the data stream. When the data stream is edited, it is determined whether or not the identification information extracted from the stream data represents a device that can encode the data stream with an attribute identical to the predetermined attribute with which the editing apparatus encodes the data stream. When determined that the identification information represent the device, a predetermined region including the edit point is decoded and encoded and the predetermined region is edited based on the edit point. Thus, the editing apparatus can know whether or not the data stream has been recorded by a corresponding recording apparatus based on the identification information that identifies the apparatus that has recorded the data stream and when determined that the data stream have been recorded by the corresponding recording apparatus, the editing apparatus can decode and encode the predetermined region containing the edit point and edit the predetermined region based on the edit point.

As described above, according to the first, second, and third aspects of the present invention, identification information is extracted from a data stream composed of video data that have been compression-encoded using the inter-frame compression. The identification information identifies a device which has created the data stream. The data stream is encoded and decoded based on an edit point that has been set to the data stream and the data stream is edited based on the edit point. When the data stream is edited, it is determined whether or not the identification information extracted from the stream data by the extracting section represents a device which can encode the video data with an attribute identical to a predetermined attribute with which the data stream is encoded by encoding using inter-frame compression. When determined that the identification information represent the device, a predetermined region including the edit point is decoded and encoded and the predetermined region is edited based on the edit point. Thus, there is an effect of which only by referring to the identification information that has been embedded in the data stream and that identifies the device which has created the data stream, it can be determined whether or not the predetermined region containing the edit point can be decoded and encoded and the predetermined region can be edited based on the edit point.

In addition, according to the fourth aspect of the present invention, a recording apparatus records a data stream of which video data has been compression-encoded using the inter-frame compression with a predetermined attribute and output as a stream file to a record medium. At this point, the recording apparatus records the data stream to the record medium such that identification information which identifies a device is embedded in the data stream. An editing apparatus reads the stream file from the record medium and extracts the data stream from the stream file, extracts the identification information from the data stream, decodes the data stream based on an edit point which has been set to the data stream, encodes the data stream according to compression encoding using inter-frame compression with a predetermined attribute, and edits the data stream. When the data stream is edited, it is determined whether or not the identification information extracted from the stream data represents a device that can encode the data stream with an attribute identical to the predetermined attribute with which the editing apparatus encodes the data stream. When determined that the identification information represent the device, a predetermined region including the edit point is decoded and encoded and the predetermined region is edited based on the edit point. Thus, there is an effect of which the editing apparatus can know whether or not the data stream has been recorded by a corresponding recording apparatus based on the identification information that identifies the apparatus that has recorded the data stream and when determined that the data stream have been recorded by the corresponding recording apparatus, the editing apparatus can decode and encode the predetermined region containing the edit point and edit the predetermined region based on the edit point.

BRIEF DESCRIPTION OF DRAWINGS

FIG. 6 is a schematic diagram showing syntax that represents an exemplary structure of information stored in SEI "User Data Unregistered SEI";

FIG. 7A and FIG. 7B are schematic diagrams showing syntax that represents an exemplary structure of a block one_modified_dv_pack( );

FIG. 8A, FIG. 8B, and FIG. 8C are schematic diagrams for describing an exemplary editing method for a video stream according to an embodiment of the present invention;

FIG. 12A FIG. 12B, and FIG. 12C are schematic diagrams showing an outlined editing process for video streams stored in two stream files;

FIG. 13A, FIG. 13B, and FIG. 13C are schematic diagrams for describing an outline of an exemplary editing process based on a technique of re-encoding only a necessarily minimum region near an edit point in the case that video streams stored in two stream files are edited;

FIG. 14A and FIG. 14B are schematic diagrams for describing an outline of an exemplary process based on a technique of re-encoding all the region to be edited in the case that video streams stored in two stream files are edited;

FIG. 15 is a block diagram showing an exemplary structure of a recoding apparatus according to an embodiment of the present invention;

DETAILED DESCRIPTION OF THE INVENTION

Next, with reference to the accompanying drawings, embodiments of the present invention will be described. First of all, for easy understanding, an exemplary format according to the present invention (hereinafter this format is referred to as the AVCHD format) will be described. The AVCHD format is a recording format in which an AV (Audio/Video) stream of which video data and audio data have been multiplexed in a predetermined manner is recorded to a recordable record medium. In the AVCHD format, an AV stream can be recorded as a file to a record medium and a recorded AV stream can be managed with a play list in the unit of a clip.

In AVCHD, video data and audio data are multiplexed according to an encoding system prescribed, for example, in ITU-T (International Telecommunication Union-Telecommunication Standardization Sector) Recommendation H. 264 or ISO (International Organization for Standardization)/IEC (International Electrotechnical Commission) International Standard 14496-10 (MPEG-4 Part 10) Advanced Video Coding (hereinafter referred to as H. 264|AVC) and the MPEG2 systems.

A bit stream that has been encoded according to the H. 264|AVC system and multiplexed according to the MPEG2 systems is referred to as a clip AV stream (or an AV stream). A clip AV stream is recorded as a file to a record medium by a predetermined file system. Hereinafter, a file to which a clip AV stream is recorded is referred to as a stream file.

The structure of data in the AVCHD format is based on the structure of a bit stream prescribed in H. 264|AVC. Next, the structure of a bit stream prescribed in H. 264|AVC will be outlined. H. 264|AVC prescribes VCL (Video Coding Layer) that handles a moving picture encoding process itself and NAL (Network Abstraction Layer) that mediates a low level system that transmits and stores encoded information. VCL and NAL are separated. Parameter sets corresponding to header information of sequences and pictures can be handled independently from information created in VCL.

Figure 1A:
FIG. 1A, FIG. 1B, and FIG. 1C are schematic diagrams for describing a decoding process for data that have been inter-frame compressed.
Figure 1B:
Figure 1C:
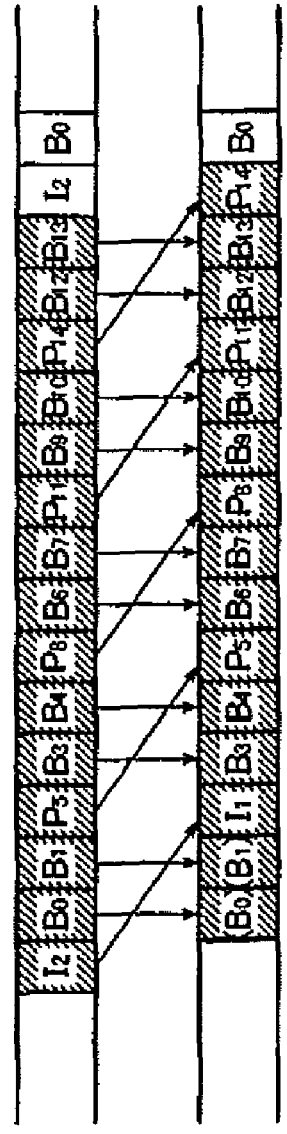
Figures 2A, 2B:
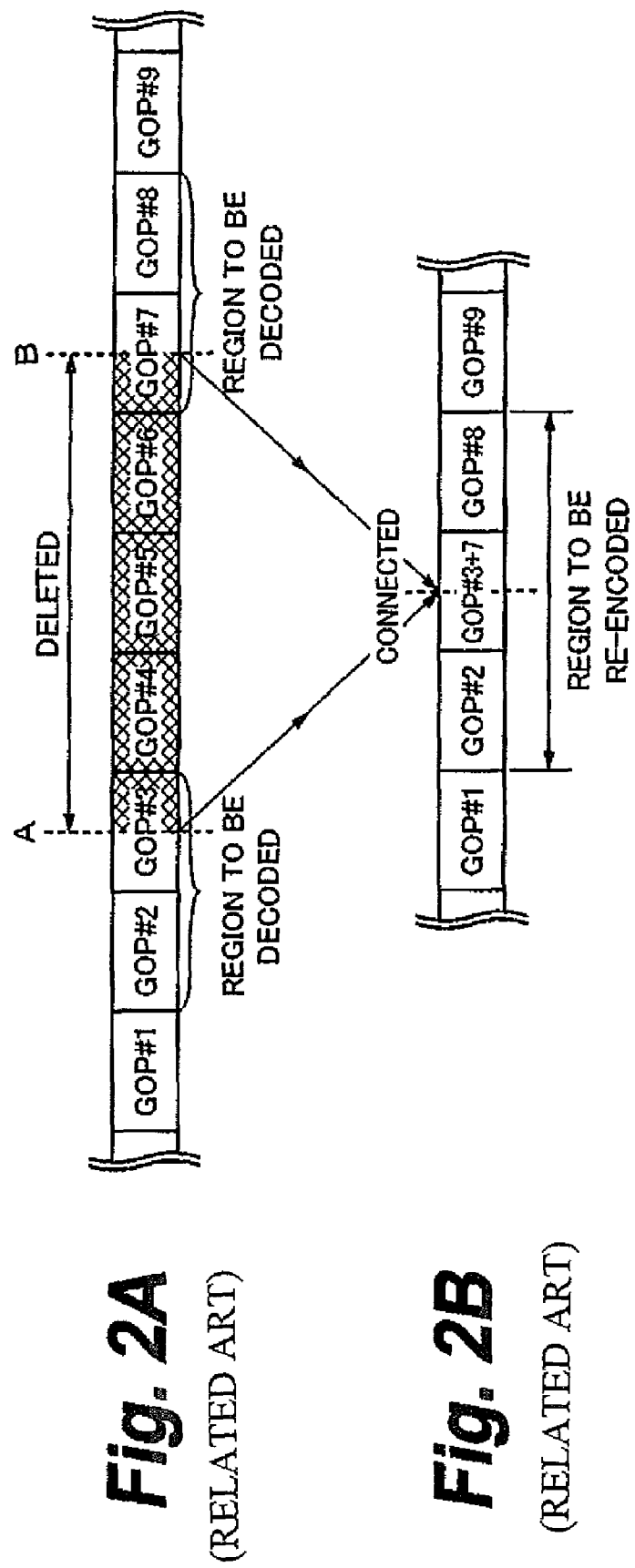
FIG. 2A and FIG. 2B are schematic diagrams for describing an editing process of deleting scenes of a middle portion of a video program and connecting the remaining portions.
Figure 3:
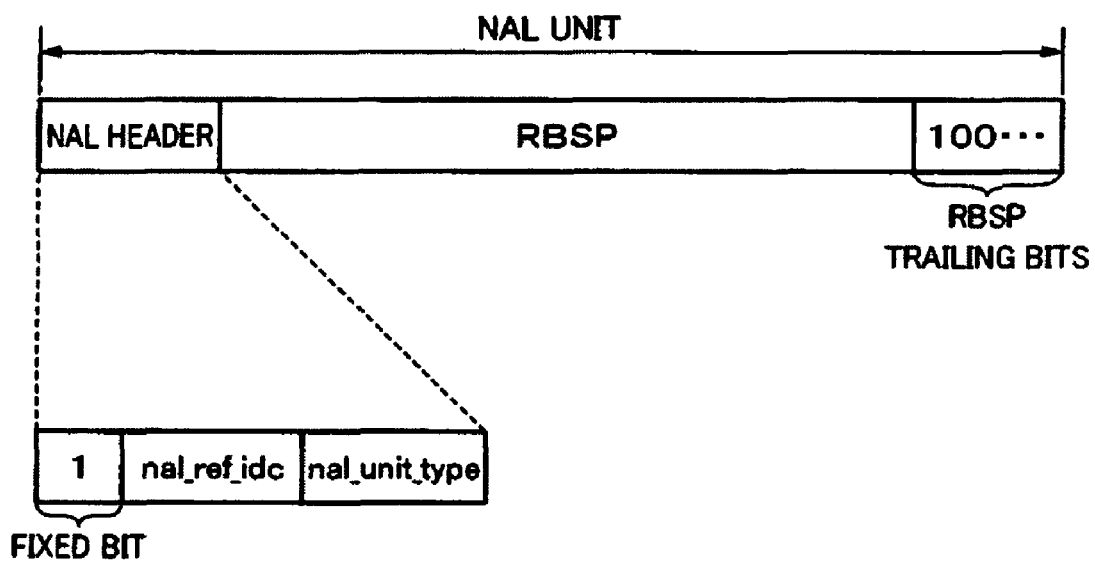
FIG. 3 is a schematic diagram showing an exemplary structure of an NAL unit.

In H. 264|AVC, a bit stream is mapped to a low level system, for example, the MPEG2 systems, based on an NAL unit that is one segment of NAL. FIG. 3 shows an exemplary structure of an NAL unit. An NAL unit is composed of an NAL header and an RBSP (Raw Byte Sequence Payload). The NAL header contains a fixed bit portion having a data length of 1 bit, information nal_ref_idc having a data length of 2 bits, and information nal_unit_type having a data length of 5 bits. The information nal_ref_idc denotes whether or not the current NAL unit stores a slice as a reference picture. The information nal_unit_type represents the type of the NAL unit. The RBSP stores raw data of which a moving picture has been compression-encoded.

RBSP trailing bits are adjustment bits with which the bit length of the NAL unit becomes a multiple of 8 bits. The RBSP trailing bits start with "1" followed by "0's". When the first bit "1" is detected, the position of the last bit of the RBSP can be identified. When "1" preceded by "0" is detected, it denotes that the position is the front end of an NAL unit.

The types of NAL units represented by the information nal_unit_type include slices of various types of pictures that have been encoded, SEI (Supplemental Enhancement Information), SPS (Sequence parameter Set), PPS (Picture Paremeter Set), AU (Access Unit) delimiter, end of sequence (EOS), and end of stream (EOS). The value of the information nal_unit_type denotes which of these types is stored in RBSP.

SEI represents additional information that is supplementary, not essential for decoding VCL. As SEI, timing information of each picture associated with a virtual reference decoder, information with respect to pan and scan functions, information used for random-access, information (user data) uniquely defined by the user, and so forth. SPS is a header that contains information with respect to encoding of all the sequence. PPS is a header that contains information with respect to an encoding mode of the entire picture. AU delimiter represents the front end of an access unit that will be described later.

Figure 4:
FIG. 4 is a schematic diagram showing an exemplary structure of an access unit.

To access information of a bit stream in the unit of one picture, a block of several NAL units is segmented and referred to as an access unit. FIG. 4 shows an exemplary structure of an access unit. In the structure of the access unit shown in FIG. 4, information other than NAL units corresponding to slices of a main picture is optional information that is not necessary to be present in the access unit. When these optional information is used, as shown in FIG. 4, they need to be arranged in the order of AU delimiter, SPS, PPS, SEI, main picture, redundant picture, EOS (End Of Sequence), and EOS (End Of Stream). Each NAL unit is identified on the basis of information of the NAL header. Since the redundant picture less relates to the present invention, its description will be omitted.

Figure 5:
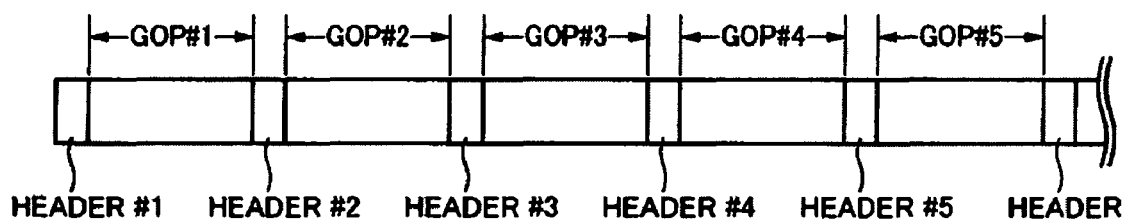
FIG. 5 is a schematic diagram showing an outline of an exemplary structure of video data according to an embodiment of the present invention.

FIG. 5 shows an outline of an exemplary structure of video data according to an embodiment of the present invention. In this embodiment, video data have the structure of GOPs (Group Of Pictures). A GOP is composed of at least one I picture, one or a plurality of P pictures, and one or a plurality of B pictures.

A header is placed at each GOP. The header corresponds to AU delimiter, SPS, PPS, and SEI shown in FIG. 4 and contains at least AU delimiter and SEI. In H.264|AVC, a plurality of names are defined for SEI. With each name, different information is transmitted. In this embodiment of the present invention, in "User Data Unregistered SEI" that is SEI that the user can uniquely define in SEI, information unique to the recording apparatus is stored.

FIG. 6 shows syntax that represents an exemplary structure of information stored in SEI "User Data Unregistered SEI". In this example, syntax is represented on the basis of the notation of C language used as a program descriptive language for computer apparatus and so forth. This applies to drawings that represent other syntaxes.

This SEI "User Data Unregistered SEI" represents the payload size, namely the entire data length of the SEI "User Data Unregistered SEI" as described as "user_data_unregistered(payloadSize)" in the first line of FIG. 6. In FIG. 6, a field uuid_iso_iec_11578 having a data length of 128 bits stores predetermined identification information. The next field type_indicator having a data length of 32 bits represents the type of SEI "User Data Unregistered SEI". If the value of a field type_indicator is "0x47413934", a block cc_data( ) that stores data of a closed caption is placed according to an if statement. Since the closed caption less relates to the present invention, its description will be omitted.

In the description of numeric values, "0x" denotes that the value is represented in hexadecimal notation. This applies to the similar notation that follows.

When the value of the field type_indicator is "0x4D44504D", according to the description of the if statement, a block ModifiedDVPackMeta( ) is described. This block ModifiedDVPackMeta( ) stores information unique to the recoding apparatus that has recorded this data. In the block ModifiedDVPackMeta( ), a field number_of_modified_dv_pack_entries having a data length of 8 bits represents the number of entries of data modified_dv_pack stored in the block ModifiedDVPackMeta( ). According to the next for loop statement, data modified_dv_pack, namely a block one_modified_dv_pack( ), are stored for the number of entries represented by this field number_of_modified_dv_pack_entries.

The block one_modified_dv_pack( ) is composed of a field mpd_id having a data length of 8 bits and a field mpd_data having a data length of 32 bits. FIG. 7A and FIG. 7B show syntax that represents an exemplary structure of the block one_modified_dv_pack( ). FIG. 7A shows an example of which the block one_modified_dv_pack( ) is a block MAKER & MODEL ID pack ( ) that stores information that represents the recording apparatus that has recorded this data. FIG. 7B is an example of which the block one_modified_dv_pack( ) is a block MAKER OPTION pack ( ) that stores information that represents the picture quality mode in which data have been recorded.

Next, the block MAKER & MODEL ID pack ( ) shown in FIG. 7A will be described. A field mpd_id has a data length of 8 bits and represents the type of this block one_modified_dv_pack( ). When the value of the field mpd_id is a predetermined value, it denotes that this block one_modified_dv_pack( ) is the block MAKER & MODEL ID pack ( ) that stores information that represents the recording apparatus that has recorded this data. In this block MAKER & MODEL ID pack ( ), the field mpd_data shown in FIG. 6 is divided into a field maker_ID and a field maker_model_code each having a data length of 16 bits. The field maker_ID represents identification information that identifies the maker of the recording apparatus that has recorded this data. The field maker_model_code represents identification information that identifies the model number and model name of the recording apparatus.

Next, the block MAKER OPTION pack ( ) shown in FIG. 7B will be described. As described above, the block MAKER OPTION pack ( ) stores information that represents the picture quality mode in which data have been recorded. In other words, it is common for an apparatus that records and reproduces a picture and a sound that the recording duration, picture quality, or sound quality are changed by gradually changing the bit rate. For example, the HQ (High Quality) mode in which the bit rate is the highest and the picture quality (or sound quality) is the highest, but the recoding duration is short, the LP (Long Play) mode in which practically sufficient picture quality and recording duration are assured and the bit rate is intermediate, and the SP (Standard Play) mode in which the picture quality is practically permissible, long time recording is prioritized, and the bit rate is low are set.

These recoding picture modes cannot be always represented in the picture and audio recording formats. Instead, these modes often tend to be, for example, specifications unique to the maker, model number, and model name of the apparatus. In addition, it is preferred that the user be informed in what mode content to be reproduced has been recorded.

Thus, it is contemplated to define a block MAKER OPTION pack ( ) that can describe recording modes unique to the maker, model number, and model name. For example, it is contemplated to use this block MAKER OPTION pack ( ) in parallel with, for example, the foregoing block MAKER & MODEL ID pack( ). For example, the block MAKER & MODEL ID pack ( ) and the block MAKER OPTION pack ( ) are described together with SEI "User Data Unregistered SEI".

In FIG. 7B, the field mpd_id has a data length of 8 bits and represents the type of the block one_modified dv_pack( ). In other words, when the field mpd_id is a predetermined value, it denotes that this block one_modified_dv_pack( ) is the block MAKER OPTION pack ( ) that stores information that represents the recording mode with respect to the picture quality in which this data have been recorded.

In this block MAKER OPTION pack ( ), the field mpd_data shown in FIG. 6 describes the recording mode with respect to the picture quality in which video data containing SEI "User Data Unregistered SEI" that stores this block MAKER OPTION pack ( ) have been recorded, for example, in the field REC_MODE having a data length of 32 bits. When the value of the field REC_MODE is "0", it represents the HQ mode. When the value of the field REC_MODE is "1", it represents the SP mode. When the value of the field REC_MODE is "2", it represents the LP mode. The recording modes are not limited to these three types. Instead, the number of recording modes may be more than three. Instead, the recording modes may be as small as two types such as the HQ mode and the SP mode.

The block MAKER OPTION pack ( ) that describes the recording mode with respect to the picture quality with which the video data have been recorded and the block MAKER & MODEL ID pack ( ) that describes the maker, model number, and the model name of the recorder that has recorded the video data are described together with SEI "User Data Unregistered SEI". Thus, when the video data are reproduced, it can be determined whether or not the video data have been recorded by a recording apparatus whose maker, model number, or model name is the same as that of the apparatus that is reproducing the video data. When it has been determined that the video data have been recorded by a recording apparatus whose maker, model name, or model number is the same as that of the apparatus that is reproducing the video data, they can be parsed and processed in the manner unique to the recording apparatus.

For example, when video data are reproduced, the recording mode with respect to the picture quality with which the video data to be reproduced have been recorded can be read from the block MAKER OPTION pack ( ) and, for example, displayed. Instead, when the recording mode with respect to the picture quality is defined to the block one_modified_dv_pack( ) stored in SEI "User Data Unregistered SEI", since information that represents the recording mode is embedded in the stream of the video data, even if an editing operation is performed for the video data, the information of the recording mode can be taken over.

Next, an embodiment of the present invention will be described. When an editing process is performed by re-encoding a necessarily minimum region near an edit point, the values of predetermined parameters contained in a video stream to be edited need to be fixed in the stream file. For example, the AVCHD format prescribes that the following parameters (1) to (6) need to be constant in one stream file.
Parameter (1): A parameter that represents the size in the horizontal direction of the picture frame
Parameter (2): A parameter that represents the size in the vertical direction of the picture frame
Parameter (3): A parameter that represents the aspect of the display image
Parameter (4): A parameter that represents the frame rate
Parameter (5): A parameter that represents the structure of frames
Parameter (6): A parameter that represents whether data of the closed caption are present or absent Specifically, these parameters (1) to (6) of AVCHD are prescribed in H. 264|AVC as follows. Parameter (1) is described as a code pic_width_in_mbs_minus1 in SPS. Parameter (2) is described as a code pic_hight_in_map_units_minus1 in SPS. Parameter (5) is described as a code frame_mbs_ony_flag in SPS. Parameter (3) is described as a code aspect_ratio_idc in SPS. Parameter (4) is obtained on the basis of a code video_format in SPS. These code aspect_ratio_idc and code video_format are described as options in SPS. In addition, parameter (6) can be decided on the basis of the value of the field type_indicator in the foregoing SEI "User Data Unregistered SEI". In other words, when the value of the field type_indicator is "0x47413934", it is determined that data of the closed caption be present.

When the editing apparatus side can encode all possible values of parameters (1) to (6) of a stream file to be edited, the editing process can be performed at high speed on the basis of the technique of re-encoding only a necessarily minimum region near an edit point. However, if the editing apparatus is designed to handle all possible values of parameters (1) to (6), the scale of the encoder inevitably becomes large and its cost rises.

Thus, according to the present invention, when a video stream is edited, information that represents the recording apparatus that has created the video stream is extracted from a predetermined position of the video stream to be edited and it is determined whether or not the recoding apparatus that has created the video stream to be edited is a predetermined recording apparatus.

The predetermined recording apparatus is a recording apparatus that satisfies the condition of which the editing apparatus side can encode the video stream with the same attributes as those of parameters (1) to (6) of the video stream that the recoding apparatus has created. Information that represents the predetermined recoding apparatus is described, for example, as the field maker_ID and the field maker_model_code in the block MAKER & MODEL ID pack ( ) stored in the block ModifiedDVPackMeta( ) in SEI "User Data Unregistered SEI" described with reference to FIG. 6, FIG. 7A, and FIG. 7B.

When the determined result denotes that the recoding apparatus that has created the video stream to be edited is the predetermined recoding apparatus, the video stream is edited on the basis of the technique of re-encoding only a necessarily minimum region near an edit point. If determined that the recording apparatus that has created the video stream to be edited be not the predetermined recording apparatus, all the video stream to be edited is decoded, the decoded video data are edited in the unit of one frame, and all the edited video data are re-encoded.

According to the present invention, when a video stream is edited, it can be easily determined whether or not the technique of re-encoding only a necessarily minimum region near an edit point can be applied on the basis of information contained in the video stream to be edited. When the editing apparatus side mainly edits the stream file recorded by the predetermined recording apparatus, the encoder of the editing apparatus can perform the editing process based on the technique of re-encoding only a necessarily minimum region only with the same parameters as those of the predetermined recording apparatus.

Next, an exemplary editing method for a video stream according to an embodiment of the present invention will be described. As exemplified in FIG. 8A, a video stream file composed of nine GOPs, GOP #1 to GOP #9, will be considered. Header #1 to header #9 have been added to GOP #1 to GOP #9, respectively. Each of header #1 to header #9 stores the foregoing SEI "User Data Unregistered SEI" that describes the block ModifiedDVPackmeta( ) that contains the data modified_dv_pack that represents information of the recording apparatus that has recorded this file.

As exemplified in FIG. 8B, an editing process is performed for the video stream stored in the file such that edit point A is set to a particular picture in GOP #3, edit point B is set to a particular picture in GOP #7, pictures contained in region A-B between edit point A and edit point B are deleted, and then edit point A and edit point B are connected. As the edited result, as exemplified in FIG. 8C, GOP #4 to GOP #6 between edit point A and edit point B have been deleted, GOP #3+7 of which GOP #3 containing edit point A and GOP #7 containing edit point B had been connected at edit point A and edit point B has been created, and thereby a video stream composed of five GOPs, GOP #1, GOP #2, GOP #3+7, GOP #8, and GOP #9, has been created. In FIG. 8B and FIG. 8C, for preventing complexity of illustration, headers are omitted.

Figure 9:
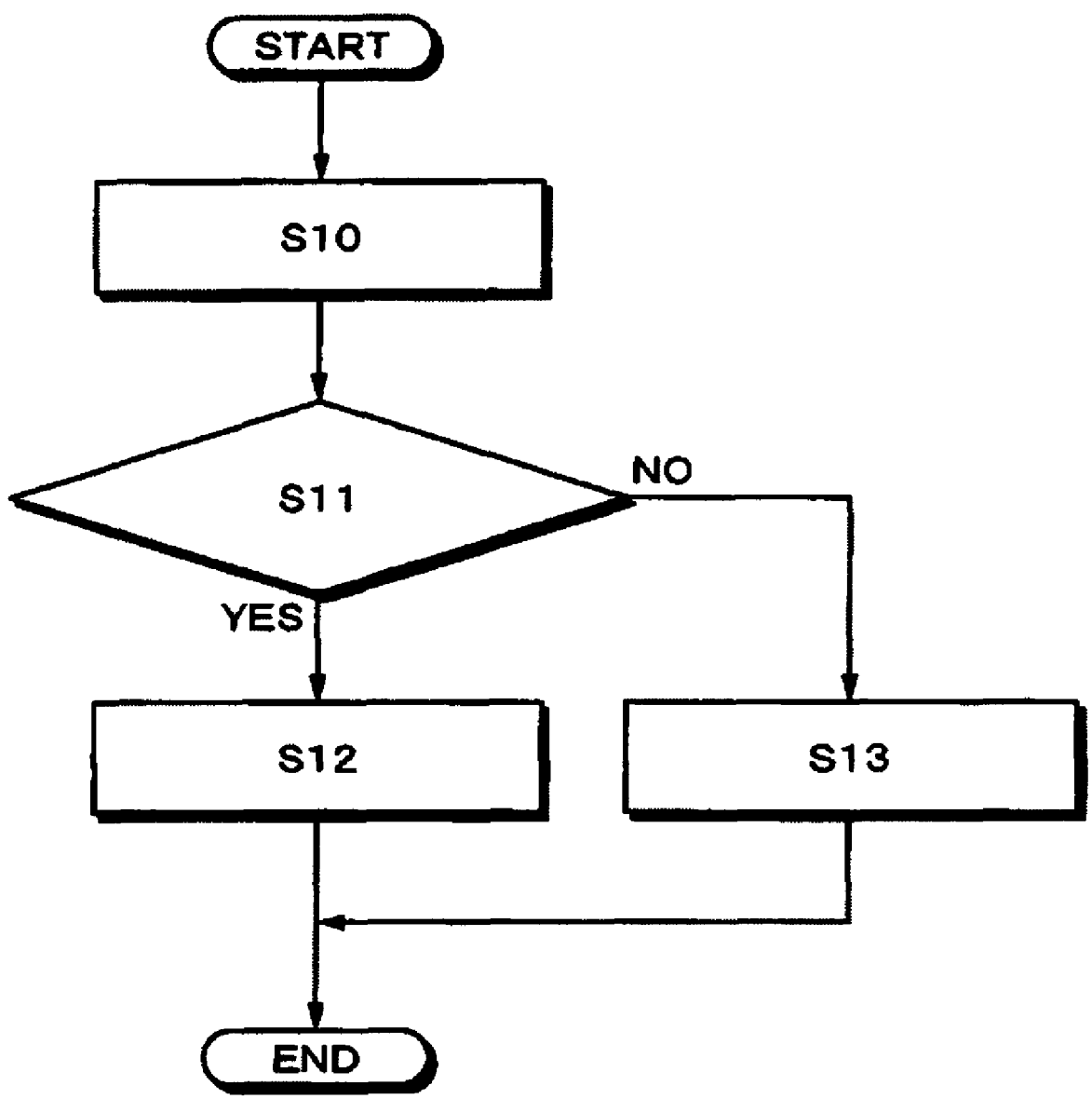
FIG. 9 is a flow chart showing an exemplary editing process based on an editing method according to an embodiment of the present invention.

FIG. 9 is a flow chart showing an exemplary editing process based on the editing method according to the embodiment of the present invention. When a file to be edited is designated, the flow advances to step S10. At step S10, the stream file to be edited is searched for the block MAKER & MODEL ID pack ( ) of the data modified_dv_pack that represents information of the recording medium that has recorded this file (refer to FIG. 6 and FIG. 7A and FIG. 7B).

For example, with reference to FIG. 8A, the NAL unit of header #1 at the front end of the video stream stored in the stream file to be edited is parsed and SEI "User Data Unregistered SEI" is extracted. Thereafter, SEI "User Data Unregistered SEI" is searched for the block ModifiedDVPackMeta( ) containing the data modified_dv_pack that represents the information of the recording apparatus that has recorded this file. In addition, the block ModifiedDVPackMeta( ) is searched for the block MAKER & MODEL ID pack ( ) on the basis of the value of the field mpd_id.

At the next step S11, the field maker_ID and the field maker_model_code are obtained from the block MAKER & MODEL ID pack ( ) and it is determined whether or not there are data of the model that can decode the video stream with the same attributes. The same attributes mean that video data can be encoded with the same parameter values, for example, with respect to the foregoing parameters (1) to (6).

For example, the editing apparatus has stored identification information (the values of the field maker_ID and the field maker_model_code) of the recoding apparatus that encodes video data with parameters that the editing apparatus can handle in storing means such as a ROM (Read Only Memory), a hard disc drive, or the like and determines whether or not the values of the field maker_ID and the field maker_model_code that have been stored match the values of the field maker_ID and the field maker_model_code obtained from the video stream to be edited.

If determined at step S11 that there be data of the model that can encode the video stream with the same attributes, the flow of the process advances to step S12. At step S12, the editing process is performed on the basis of the technique of re-encoding only a necessarily minimum region near an edit point of the video stream to be edited. In contrast, if determined at step S11 that there be no data of the model that can encode the video stream with the same attributes, the flow of the process advances to step S13. At step S13, the editing process is performed on the basis of the technique of re-encoding all the region of the video stream to be edited.

When a plurality of stream files are to be edited, edit points are set to each of, for example, two stream files and the two files are connected on the basis of the edit points, the processes of step S10 and step S11 are performed for each stream file to be edited. For example, each of the two files to be edited is searched for the block MAKER & MODEL ID pack ( ) (at step S10) and the values of the field maker_ID and the field maker_model_code of the block MAKER & MODEL ID pack ( ) are determined (at step S11).

When the values of the field maker_ID and the field maker_model_code of the two files to be edited match those stored in the editing apparatus, the process of re-encoding only a necessarily minimum region near an edit point is performed at step S12.

Figure 10A:
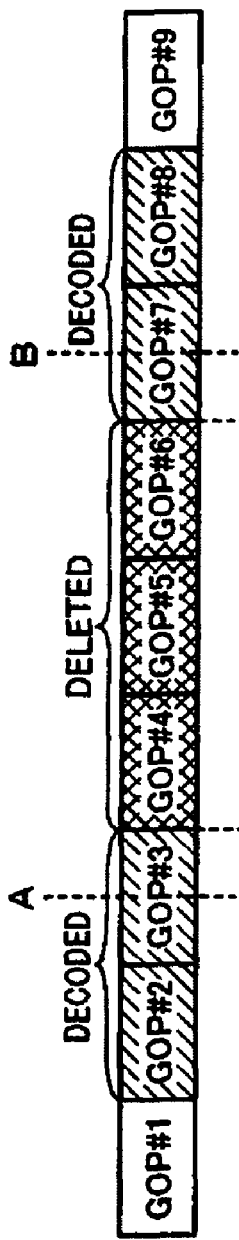
FIG. 10A, FIG. 10B, and FIG. 10C are schematic diagrams for describing an outline of an exemplary editing process based on a technique of re-encoding only a necessarily minimum region near an edit point.
Figure 10B:
Figure 10C:
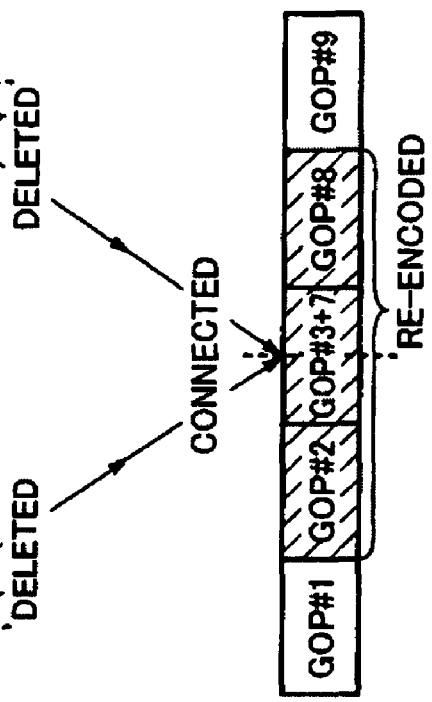

Next, with reference to FIG. 10A, FIG. 10B, and FIG. 10C, an exemplary editing process based on the technique of re-encoding only a necessarily minimum region near an edit point will be outlined. The structure of the video stream exemplified in FIG. 10A, FIG. 10B, and FIG. 10C corresponds to that shown in FIG. 8A, FIG. 8B, and FIG. 8C, respectively, and the video stream is composed of nine GOPs, GOP #1 to GOP #9. As described above, the editing process is performed for this video stream such that edit point A is designated in GOP #3, edit point B is designated in GOP #7, and region A-B is deleted.

First of all, as exemplified in FIG. 10A, the video stream is deleted from GOP #4 immediately following GOP #3 containing edit point A to GOP #6 immediately preceding GOP #7 containing edit point B in the unit of one GOP. GOP #3 containing edit point A and GOP #2 immediately preceding GOP #3 are decoded. Likewise, GOP #7 containing edit point B and GOP #8 immediately following GOP #7 are decoded.

Thereafter, as exemplified in FIG. 10B, in the decoded GOP #3, the region from edit point A to the rear end of GOP #3 is deleted in the unit of one frame. Likewise, in the decoded GOP #7, the region from the front end of GOP #7 to edit point B is deleted in the unit of one frame. Thereafter, as exemplified in FIG. 10C, edit point A and edit point B are connected and then GOP #2, GOP #3+7, and GOP #8 are re-encoded.

In the state shown in FIG. 10A, it can be contemplated that pre-decoded GOP #2 is stored in the memory or the like, GOP #3+7 and GOP #8 are re-encoded, and pre-decoded and stored GOP #3 is copied such that it immediately precedes the encoded GOP #3+7.

Figures 11A, 11B:
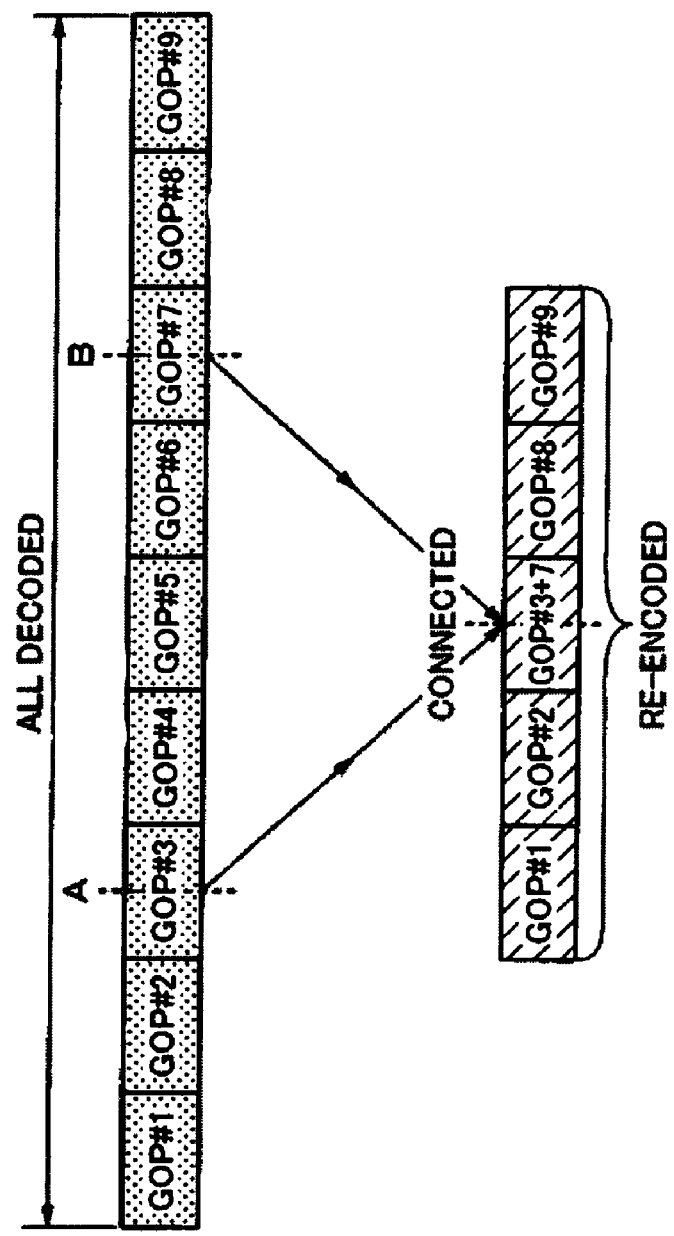
FIG. 11A and FIG. 11B are schematic diagrams for describing an outline of an exemplary editing process based on a technique of re-encoding all the region of a video stream to be edited.

Next, with reference to FIG. 11A and FIG. 11B, an exemplary editing process on the basis of the technique of re-encoding all the region of the video stream to be edited at step S13 will be outlined. It is assumed that the structure of the video stream to be edited is the same as that shown in FIG. 8A, FIG. 8B, and FIG. 8C, and FIG. 10A, FIG. 10B, and FIG. 10c. In this case, as exemplified in FIG. 11A, the entire video stream to be edited (GOP #1 to GOP #9 in the example shown in FIG. 11A and FIG. 11B) is decoded, the video stream from edit point A to edit point B is deleted in the unit of one frame, and then edit point A and edit point B are connected. When edit point A and edit point B have been connected, GOP #3+7 is created. After GOP #3+7 has been created, all GOP #1, GOP #2, GOP #3+7, GOP #8, and GOP #9 as the edited result are re-encoded (refer to FIG. 11B).

In the foregoing exemplary description, edit point A and edit point B are set to a video stream stored in one stream file and the video stream is edited on the basis of edit point A and edit point B. However, the foregoing process can be applied to the case that edit point A and edit point B are set to each of video streams stored in two stream files and the video streams are edited on the basis of edit point A and edit point B.

FIG. 12A, FIG. 12B, and FIG. 12C show an outlined editing process for video streams stored in two stream files. A first stream file that stores a video stream 100 that ends with GOP #m and a second stream file that stores a video stream 101 that starts with GOP #1 are considered (refer to FIG. 12A). Edit point A is set in GOP #m−1 of the video stream 100 and edit point B is set in GOP #2 of the video stream 101. Thereafter, the region from edit point A to the rear end of the video stream 100 is deleted. In addition, the region from the front end to edit point B of the video stream 101 is deleted (refer to FIG. 12B). Thereafter, edit point A and edit point B are connected and thereby one video stream 102 is created (refer to FIG. 12C).

Next, with reference to FIG. 13A, FIG. 13B, and FIG. 13C, an exemplary editing process for video streams stored in two stream files on the basis of the technique of re-encoding only a necessarily minimum region near an edit point at the foregoing step S12 will be outlined. It is assumed that the structures of video streams, settings of edit point A and edit point B, edit positions, and so forth exemplified in FIG. 13A, FIG. 13B, and FIG. 13C are the same as those exemplified in FIG. 12A, FIG. 12B, and FIG. 12c.

First of all, as exemplified in FIG. 13A, GOP #m immediately following GOP #m−1 containing edit point A is deleted from a video stream 100 in the unit of one GOP and then GOP #m−1 and GOP #m−2 immediately preceding GOP #m−1 are decoded. Likewise, GOP #1 immediately preceding GOP #2 containing edit point B is deleted from a video stream 101 in the unit of one GOP and then GOP #2 and GOP #3 immediately following GOP #2 are decoded.

Thereafter, as exemplified in FIG. 13B, the region from edit point A to the rear end of GOP #m−1 of the video stream 100 is deleted in the unit of one frame. Likewise, the region from the front end to edit point B of the decoded GOP #2 of the video stream 101 is deleted in the unit of one frame. Thereafter, as exemplified in FIG. 13C, edit point A and edit point B are connected, GOP #m−2, GOP #(m−1)+(2), and GOP #3 are re-encoded and thereby one video stream 102 is created.

In the state shown in FIG. 13A, it can be contemplated that pre-decoded GOP #2 is stored in the memory or the like, GOP #3+7 and GOP #8 are re-encoded, and pre-decoded and stored GOP #2 is copied such that it immediately precedes the encoded GOP #3+7.

Next, with reference to FIG. 14A and FIG. 14B, an exemplary editing process for video streams stored in two stream files on the basis of the technique of re-encoding all the region to be edited at the foregoing step S13 will be outlined. It is assumed that the structures of video streams, settings of edit point A and edit point B, edit positions, and so forth exemplified in FIG. 14A and FIG. 14B are the same as those exemplified in FIG. 12A, FIG. 12B, and FIG. 12c. In this case, as exemplified in FIG. 14A, all a video stream 100 to be edited and all a video stream 101 to be edited are decoded. The region from edit point A to the rear end of the video stream 100 is deleted in the unit of one frame and thereby a video stream 100' is obtained. Likewise, the region from the front end to edit point B of the video stream 101 is deleted in the unit of one frame and thereby a video stream 101' is obtained. Thereafter, as exemplified in FIG. 14B, edit point A and edit point B are connected, the all the video stream is re-encoded, and thereby one video stream 102 is obtained.

As exemplified with reference to FIG. 10A, FIG. 10B, and FIG. 10C, FIG. 11A and FIG. 11B, FIG. 13A, FIG. 13B, and FIG. 13C, and FIG. 14A and FIG. 14B, when edit point A and edit point B are connected and thereby a new GOP is created, the number of pictures contained in the new GOP may be smaller than or larger than the predetermined number of pictures depending on the positions of edit point A and edit point B in the GOP. In this case, it can be contemplated that copy, decimation, or the like is performed for pictures such that the number of pictures of the new GOP becomes the predetermined number of pictures.

The procedure of the technique of re-encoding only a necessarily minimum region near an edit point described with reference to FIG. 10A, FIG. 10B, and FIG. 10C and FIG. 13A, FIG. 13B, and FIG. 13C is just exemplary of an embodiment of the present invention. The present invention is not limited to such a procedure.

In addition, in the foregoing, when determined at step S11 shown in FIG. 9 that there be no data of the model that can encode the video stream with the same attributes and the flow of the process advances to step S13, the editing process is performed on the basis of the technique of re-encoding all the region to be edited. However, the present invention is not limited to such an example. For example, the user may be warned by predetermined display means that there is a possibility of which the video stream to be edited does not correspond to the apparatus.

FIG. 15 shows an exemplary structure of a recording apparatus according to an embodiment of the present invention. This recording apparatus compression-encodes input video data and audio data according to a predetermined system, multiplexes the compression-encoded video data and audio data, obtains one data stream, and records the data stream as a file to a record medium.

The recoding apparatus 1 exemplified in FIG. 15 is used as a recording block of a video camera apparatus to record video data based on a captured image signal to a record medium together with a camera block that has, for example, an optical system, an image capturing device, and so forth. Instead, the recoding apparatus 1 may be used as an independent recording apparatus that records video data and audio data that are input from the outside to a record medium.

It can be contemplated that applicable compression-encoding systems and multiplexing systems include various systems. For example, a system prescribed in H. 264|AVC may be applied to the compression-encoding system according to an embodiment of the present invention. In addition, for example, the MPEG2 systems are applied to the multiplexing system.

A record medium 20 on which data are recorded may be, for example, a recordable type DVD (Digital Versatile Disc). It can be contemplated that as the record medium 20, a Blu-ray Disc (registered trademark) that accomplishes a larger capacity than others is applied. Instead, as the record medium 20, a semiconductor memory or a hard disk drive may be applied.

A control section 5 is composed, for example, of a CPU (Central Processing Unit), a RAM (Random Access Memory), a ROM (Read Only Memory), and so forth (not shown). The control section 5 controls the entire recoding apparatus 1 based on a program and data pre-stored in the ROM with the RAM that is used as a work memory. A program that operates on the control section 5 provides a file system used in the recording apparatus. For example, the control section 5 associates physical addresses of the record medium 20 with files that store the data on the basis of the file system and creates logical management information of files that store each type of data.

A UI (User Interface) section 6 has switches with which the user operates the recording apparatus. The UI section 6 outputs control signals corresponding to operations of the switches. The control signals are supplied to the control section 5. The control section 5 controls each section of the recoding apparatus 1 as the processes of the program based on the control signals supplied from the UI section 6 corresponding to the user's operations. For example, corresponding to an operation to the UI section 6, the recording start and stop operations of the recording apparatus are controlled by the control section 5.

Base band digital video data are input from a terminal 10 and supplied to a video encoder 11. The video encoder 11 has a buffer memory that can store a plurality of frames of video data, stores the supplied base band digital video data in the buffer memory, and compression-encodes the base band digital video data according to a predetermined system. In this example of which the base band digital video data are compression-encoded in the AVCHD format, namely a system prescribed in H. 264|AVC, the base band digital video data are intra-frame compressed, for example, according to DCT (Discrete Cosine Transform) and intra-screen prediction and the resultant base band digital video are inter-frame compressed using a moving vector, and then the resultant base band digital video data are entropy-encoded so as to improve compression efficiency.

The video encoder 11 creates additional information such as SPS, PPS, and SEI based on the compression-encoded video data. At this point, identification information that identifies the maker name of the recoding apparatus 1 and identification information that identifies the model name and model number as the values of the field maker_ID and the field maker_model_code of the block MAKER & MODEL ID pack ( ) of SEI "User Data Unregistered SEI". The identification information of these maker name, model name, and model number are pre-stored in the RAM (not shown) of the recoding apparatus 1. The video encoder 11 creates the NAL unit based on the compression-encoded video data and the additional information such as SPS, PPS, and SEI and outputs them as an H. 264|AVC elementary stream (ES).

According to the prescription of H. 264|AVC, a coded picture buffer (CPB) that is an input side buffer of a decoder and a decoded picture buffer (DPB) that is an output side buffer are defined in a decoder model. The encoder needs to create a bit stream (elementary stream) such that these CPB and DPB do not malfunction. The video encoder 11 controls the encoding process for video data such that the generated code amount satisfies this prescription.

At this point, based on the generated code amount, storage amount information of CPB, namely the input side buffer, can be obtained and the obtained storage amount information can be inserted into an elementary stream obtained by the encoding process in a predetermined manner. For example, in the NAL unit, the storage amount information of the buffer can be described in a code bit_rate_scale, a code cpb_size_scale, a code bit_rate_value_minus1, a code cpb_size_value_minus1, and so forth as options of SPS. This storage amount information may be described for each picture or each GOP.

A multiplexer (MUX) 12 multiplexes an elementary stream that is output from the video encoder 11 and an elementary stream of audio data that is output from an audio encoder (not shown) according to a predetermined system and outputs the multiplexed stream as one data stream. In the example of which elementary streams of video data and audio data are multiplexed on the basis of the MPEG2 systems, the elementary stream of the supplied video data and the elementary stream of the audio data are multiplexed using an MPEG2 transport stream on time division basis.

For example, the multiplexer 12 has a buffer memory and temporarily stores a supplied elementary stream in the buffer memory. The elementary stream stored in the buffer memory is divided in a predetermined size, a header is added to each divided portion, and thereby PES (Packetized Elementary Stream) packets are obtained. The header stores predetermined information prescribed in the MPEG2 systems, such as PTS that represents the reproducing time of data stored in the packet and DTS that represents the decoding time.

Each PES packet is further divided and placed in the payload of each transport packet (TS packet). The header of each TS packet stores PID (Packet Identification) that identifies the type of data placed in the payload. A header having a predetermined data length is added to each TS packet and thereby source packets are obtained. The multiplexer 12 combines these source packets and outputs one data stream.

The data stream that is output from the multiplexer 12 is temporarily stored in a stream buffer 13. The write timing of the data stream to the stream buffer 13 and the read timing of the data stream from the stream buffer 13 are controlled in a predetermined manner in the unit of one source packet to match the access speed of the record medium 20 with the signal process speed of encoding of audio and video data.

Source packets that are read from the stream buffer 13 are supplied as a data stream to a recording processing section 14. The recording processing section 14 performs an error correction encoding process and a record coding process for the supplied data, modulates the obtained data in a predetermined manner, and records the modulated data to the record medium 20. At this point, the recording processing section 14 writes data to a designated address based on a command supplied from a high level section, such as the control section.

Figure 16:
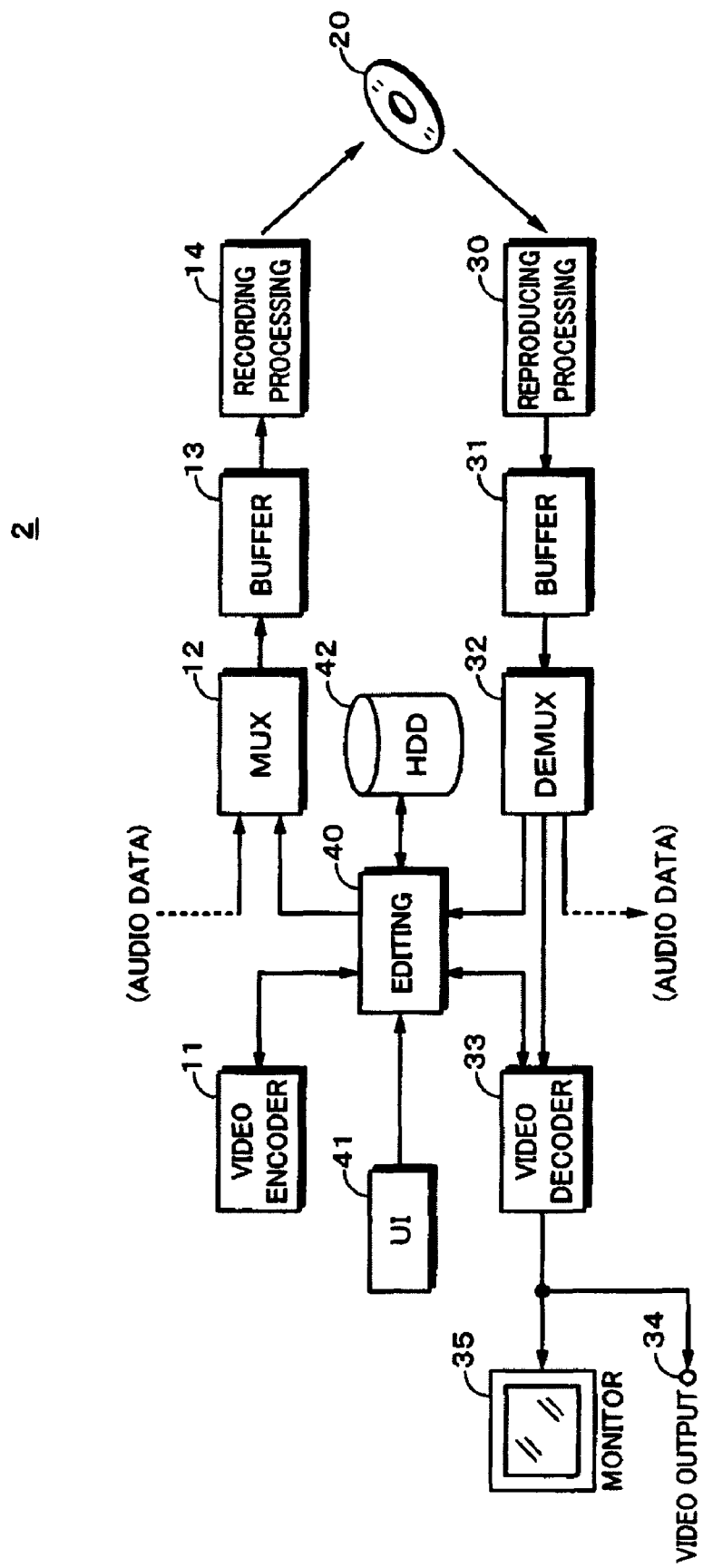
FIG. 16 is a block diagram showing an exemplary structure of an editing apparatus according to an embodiment of the present invention.

FIG. 16 shows an exemplary structure of an editing apparatus 2 according to an embodiment of the present invention. The editing apparatus 2 can edit a video stream stored in a stream file that the foregoing recoding apparatus 1 has recorded on the record medium 20. In other words, the editing apparatus 2 reproduces a stream file from the record medium 20, obtains a video stream, decodes and encodes the video stream in a predetermined manner, and records the resultant video data to the record medium 20. Since the editing apparatus 2 has the same recording structure as the recoding apparatus 1, sections in common with those shown in FIG. 15 are denoted by the same reference numerals and their detailed description will be omitted.

The whole editing apparatus 2 is controlled by a control section (not shown) according to a program. The control section has a CPU (Central Processing Unit), a ROM (Read Only Memory), and a RAM (Random Access Memory). The editing apparatus 2 operates the RAM as a work memory, exchanges commands, statuses, data, and so forth with each section of the editing apparatus 2, and controls the operation of the editing apparatus 2 based on a program and data pre-stored in the ROM. In addition, a file system used in the editing apparatus 2 is provided by a program that operates on the control section. For example, the control section can access a file recorded on the record medium 20 by the file system according to a predetermined operation to the UI section 41.

A reproducing processing section 30 controls the reproduction of data recorded on the record medium 20. In other words, the reproducing processing section 30 reads data from a designated address of the record medium 20 according to a command received from a high level section such as the control section. The reproducing processing section 30 demodulates a reproduction signal of data that have been read from the record medium 20, decodes a record code of the demodulated signal, decodes an error correction code of the reproduction digital data, corrects errors of the reproduction digital data, and obtains a reproduction data stream. The reproduction data stream is composed of one stream of source packets.

The data stream that is output from the reproducing processing section 30 is temporarily stored in a stream buffer 31. The write timing of the data stream to the stream buffer 13 and the read timing of the data stream from the stream buffer 13 are controlled in a predetermined manner in the unit of one source packet to match the access speed of the record medium 20 with the signal process speed of encoding of audio and video data.

The data stream that is read from the stream buffer 31 is supplied to a demultiplexer (DEMUX) 32. The demultiplexer 32 demultiplexes the data stream into video data and audio data and extracts them from the data stream. In this example, the demultiplexer 32 extracts source packets from the supplied data stream, separates the header from each of the extracted source packets, and obtains TS packets. In addition, the demultiplexer 32 detects PID from the header of each TS packet and sorts TS packets according to types of data stored in the payload, extracts data from the payload for each TS packet, and reassembles PES packets. In addition, the demultiplexer 32 extracts compressed video data and compressed audio data from the payload of each PES packet, adds header information and so forth to the extracted compressed video data and audio data based on information stored in the PES header, and outputs one elementary stream of video data and one elementary stream of audio data.

The elementary stream of audio data that has been output from the demultiplexer 32 is supplied to an audio processing section (not shown).

The elementary stream of video data that has been output from the demultiplexer 32 is supplied to a video decoder 33. The video decoder 33 has a buffer memory that can store a plurality of frames of video data, stores the supplied compressed video data in the buffer memory, decodes the compressed video data according to the decoding system corresponding to the compression-encoding system, and outputs the decoded data as base band digital video data.

In the example of which video data are compression-encoded on the basis of a system prescribed in H. 264|AVC, the video decoder 33 performs a decoding process based on the system prescribed in H. 264|AVC. In other words, the video decoder 33 parses the NAL unit, extracts compression-encoded video data and additional information such as SPS, PPS, and SEI from the NAL unit. The video decoder 33 performs a decoding process for the compression-encoded video data based on information extracted from the NAL unit.

The video decoder 33 can decode and output data based on the times represented by DTS (Decoding Time Stamp) and PTS (Presentation Time Stamp) extracted by the demultiplexer (DEMUX) 32 that will be described later. Base band digital video data that are decoded and obtained by the video decoder 33 are output from a terminal 34. When a monitor 35 that displays pictures is connected to the editing apparatus 2, base band digital video data that are output from the video decoder 33 are also supplied to the monitor 35. It is assumed that the monitor 35 corresponds to base band digital video data.

The H. 264|AVC standard prescribes many applicable picture formats. The AVCHD format restricts recording formats for recordable record mediums to the HD (High Definition) format in which the aspect ratio is 16:9 and the picture frame size is 1920 lines×1080 pixels and the SD (Standard Definition) format in which the aspect ratio is 4:3 and the picture frame size is 720 lines×480 pixels.

It is thought that when the compression-encoding process for video data and the decoding process for video data that have been compression-encoded are compared, the load of the compression-encoding process is much larger than that of the decoding process. Thus, the editing apparatus 2 according to this embodiment restricts the function of the video encoder 11, for example, to the HD format as a format in which the video encoder 11 can encode video data. In contrast, since the load of the process of the video decoder 33 is relatively low, it can handle both the SD format and the HD format.

A UI section 41 has various switches with which the user edits video data. The UI section 41 outputs control signals corresponding to operations of the switches. An editing section 40 exchanges commands and data with a control section (not shown) based on control signals supplied from the UI section 41, controls the entire editing apparatus 2, and performs an editing process for a video stream stored in a stream file recorded on the record medium 20. The editing section 40 has a hard disk drive 42 and performs the editing process with the hard disk drive 42.

The video encoder 11 compression-encodes video data supplied from the editing section 40 on the basis of a system prescribed in H. 264|AVC. In other words, the video encoder 11 compression-encodes video data in the same manner as the recoding apparatus 1 described with reference to FIG. 15 and creates additional information such as SPS, PPS, and SEI on the basis of the compression-encoded video data. At this point, the video encoder 11 creates identification information that identifies the maker name of the editing apparatus 2 and identification information that identifies the model name and model number of the editing apparatus 2 as the values of the field maker_ID and the field maker_model_code of the block MAKER & MODEL ID pack ( ) of SEI "User Data Unregistered SEI" and adds the created values to SEI "User Data Unregistered SEI". The video encoder 11 creates the NAL unit with the compression-encoded video data and these additional information such as SPS, PPS, and SEI and outputs it as an H. 264|AVC elementary stream (ES).

The multiplexer 12 multiplexes the elementary stream supplied from the editing section 40 and the elementary stream of audio data that is output from an audio encoder (not shown) according to a system based on the MPEG2 systems. In other words, the multiplexer 12 divides the supplied elementary stream in a predetermined size, adds a header that stores predetermined information such as PTS and DTS to each divided portion, and obtains PES (Packetized Elementary Stream) packets. The multiplexer 12 divides each PES packet, places the divided portions of each PES packet in the payload of each TS packet, creates PID in a predetermined manner, and adds a header to each TS packet. The multiplexer 12 adds a header having a predetermined length to each TS packet, creates source packets, connects them, and outputs one data stream.

The data stream that is output from the multiplexer 12 is supplied to the recording processing section 14 through the stream buffer 13. The recording processing section 14 error-correction encodes and record-encodes the data stream in a predetermined manner, performs a modulating process for the encoded stream, obtains a record signal, and records the record signal to the record medium 20.

Next, the editing process of the editing apparatus 2 will be outlined. For example, the case of which a video stream stored in one stream file is edited with edit point A and edit point B designated as described with reference to FIG. 8A, FIG. 8B, and FIG. 8C will be described. The user performs a predetermined operation for the UI section 41 to designate a file to be edited in those recorded on the record medium 20. The editing section 40 controls the editing apparatus 2 to read the stream file to be edited from the record medium 20 based on a control signal that is output from the UI section 41. When the stream file is read from the record medium 20, an elementary stream is extracted therefrom and then written to the hard disk drive 42.

For example, the stream file that is read from the record medium 20 is supplied to the demultiplexer 32 through the reproducing processing section 30 and the stream buffer 31. In the demultiplexer 32, the packets of the stream file are disassembled, header information is extracted therefrom, data of payload of each packet is extracted, and then an elementary stream is assembled. This elementary stream is supplied to the editing section 40 and then written to the hard disk drive 42.

According to a predetermined operation to the UI section 41, the elementary stream is read from the hard disk drive 42 and supplied as base band digital video data to the video decoder 33. The digital video data are supplied to the monitor 35 and displayed thereon. While observing pictures on the monitor 35, the user operates the UI section 41 to designate edit point A and edit point B. Edit point A and edit point B are designated, for example, with frame numbers, time codes, or the like. Information of edit point A and edit point B is supplied from the UI section 41 to the editing section 40 and stored therein. When an operation for an editing execution command is performed for the UI section 41, the editing section 40 starts the editing process based on the control signal supplied from the UI section 41.

In other words, as described with reference to FIG. 9, the elementary stream written to the hard disk drive 42 is supplied to the video decoder 33. The video decoder 33 parses the NAL unit of the supplied elementary stream and extracts SEI "User Data Unregistered SEI" therefrom. The extracted SEI "User Data Unregistered SEI" is supplied to the editing section 40.

The editing section 40 searches the supplied SEI "User Data Unregistered SEI" for the block ModifiedDVPack Meta( ) containing the data modified_dv_pack that represents information of the recording apparatus that has recorded this file and also searches the block ModifiedDVPackMeta( ) for the block MAKER & MODEL ID pack ( ) based on the value of the field mpd_id (at step S10 shown in FIG. 9). The editing section 40 determines whether or not there are data of a model that can encode the video stream with the same attributes based on the field maker_ID and the field maker_model_code stored in the searched block MAKER & MODEL ID pack ( ) at step S11 shown in FIG. 9.

It is assumed that the information of a model that can encode the video stream with the same attributes as those of the editing apparatus 2 is pre-stored in the ROM (not shown) of the control section, the hard disk drive 42 connected to the editing section 40, or the like. In addition, information of SEI "User Data Unregistered SEI" of the stream file to be edited may be obtained and stored in the editing section 40 when the stream file is reproduced to designate edit point A and edit point B.

When determined that there be data of a model that can encode the video stream with the same attributes, the editing process is performed on the basis of the technique of re-encoding only a necessarily minimum region at step S12 shown in FIG. 9.

As exemplified with reference to FIG. 10A, FIG. 10B, and FIG. 10C, the editing section 40 reads GOP #3 containing edit point A and GOP #2 immediately preceding GOP # from an elementary stream written to the hard disk drive 42. For example, the editing section 40 parses the NAL unit of the elementary stream in a predetermined manner, detects the position of each GOP, and reads desired GOPs, GOP #2 and GOP #3. These GOP #2 and GOP #3 are supplied to the video decoder 33 and decoded thereby. The decoded data are supplied to the editing section 40 and then written to the hard disk drive 42. Instead, the decoded data may be written to the RAM (not shown) of the editing section 40. The editing section 40 deletes the region after edit point A of the decoded GOP #3 written in the hard disk drive 42.

Likewise, the editing section 40 reads GOP #7 containing edit point B and GOP #8 immediately following GOP #7 from the elementary stream written in the hard disk drive 42. The GOP #7 and GOP #8 that have been read are supplied to the video decoder 33 and decoded thereby. The decoded data are supplied to the editing section 40 and then written to the hard disk drive 42 or the like. The editing section 40 deletes the region from the front end to edit point B of the decoded GOP #7 written in the hard disk drive 42.

Thereafter, the editing section 40 connects the GOP #3 from which the region after edit point A has been deleted and the GOP #7 from which the region from the front end to edit point B has been deleted and creates GOP #3+7 as a new GOP. When these GOPs are connected, if the number of pictures contained in the connected GOP does not become a predetermined number of pictures, interpolation, decimation, or the like is performed for pictures such that the number of pictures of the GOP becomes the predetermined number of pictures.

The editing section 40 supplies GOP #2, GOP #3+7, and GOP #8 written in the hard disk drive 42 to the video encoder 11 and causes it to re-encode them. The re-encoded GOP #2, GOP #3+7, and GOP #8 are written to the hard disk drive 42. At this point, pre-decoded GOP #2 that has been written to the hard disk drive 42 first can be overwritten with re-encoded GOP #2 written in the hard disk drive 42. The editing section 40 successively reads GOP #1, GOP #2, GOP #3+7, GOP #8, and GOP #9 from the hard disk drive 42 and outputs one elementary stream.

When the storage amount information of the foregoing buffer has been described in the elementary stream to be edited, the editing section 40 controls the generated code amount based on the storage amount information and encodes GOPs. For example, the editing section 40 parses the NAL unit of each of GOP #2 immediately preceding GOP #3 containing edit point A, GOP #3 containing edit point A, GOP #7 containing edit point B, and GOP #8 immediately following GOP #7, obtains the storage amount information of the buffer, and performs an encoding process for these GOPs based on the obtained storage amount information such that each GOP can be seamlessly connected and reproduced.

In contrast, when determined that there be no data of a model that can encode the video stream with the same attributes based on information of the block MAKER & MODEL ID pack ( ) of the block ModifiedDVPackMeta( ) in SEI "User Data Unregistered SEI" at step S11 shown in FIG. 9, the editing process is performed on the basis of the technique of re-encoding all the region of the video stream to be edited at step S13 shown in FIG. 9.

As an example, as described with reference to FIG. 11A and FIG. 11B, the editing section 40 reads an elementary stream from the hard disk drive 42 and supplies the elementary stream to the video decoder 33. The video decoder 33 decodes all the supplied elementary stream. The decoded data are supplied to the editing section 40 and then supplied to the hard disk drive 42.

The editing section 40 deletes the region from edit point A to edit point B of the decoded video data in the unit of one frame and connects edit point A and edit point B. At this point, when edit point A and edit point B are connected, if the number of pictures contained in a GOP containing the connection portions does not become a predetermined number of pictures, the editing section 40 performs interpolation, decimation, or the like for pictures such that the number of pictures contained in the GOP becomes the predetermined number of pictures.

The video data of which edit point A and edit point b have been connected are supplied to the video encoder 11. The video encoder 11 re-encodes the supplied video data for all the length and outputs the re-encoded data as one elementary stream. This elementary stream is supplied to the editing section 40 and then written to the hard disk drive 42. The data may be read from the hard disk drive 42 and supplied to the multiplexer 12, the stream buffer 13, and the recording processing section 14. The resultant data that have been processed by the multiplexer 12, the stream buffer 13, and the recording processing section 14 may be written to the record medium 20 or output to the outside through an external interface (not shown).

Since the process of setting edit point A and edit point B for two stream files, editing these stream files, and obtaining one data stream is the same as the process of setting edit point A and edit point B for one stream file and editing the stream file, the description of the process will be omitted.

In the foregoing description, the editing apparatus 2 reproduces data from the record medium 20 and edits a data stream stored in a stream file recorded on the record medium 20. However, this operation is just exemplary. In other words, the editing apparatus 2 may edit video data supplied from the outside.

When video data are supplied as an H. 264|AVC elementary stream from the outside, the elementary stream supplied from the outside is input to the editing section 40 and then written to the hard disk drive 42. In the procedure described with reference to FIG. 9, a determination process is performed on the basis of maker information and model name or model number information embedded in the data stream. According to the determined result, the editing process is performed on the basis of the technique of re-encoding only a necessarily minimum region or the technique of re-encoding all the region of the video stream to be edited When video data are supplied as a data stream that is a series of source packets or a transport stream according to the MPEG2 systems from the outside, for example, a data stream supplied from the outside is input to the demultiplexer 32, the packets are disassembled, header information is removed from each of the packets, data are extracted from the payload of each packet, and then an elementary stream is reassembled. This elementary stream is supplied to the editing section 40 and then written to the hard disk drive 42. Thereafter, the same processes as those described above are performed.

In the foregoing description shown in FIG. 16, the editing apparatus 2 that performs the editing process according to an embodiment of the present invention is structured as dedicated hardware. This structure is just exemplary. For example, the editing apparatus may be composed of a computer apparatus such as a personal computer.

Figure 17:
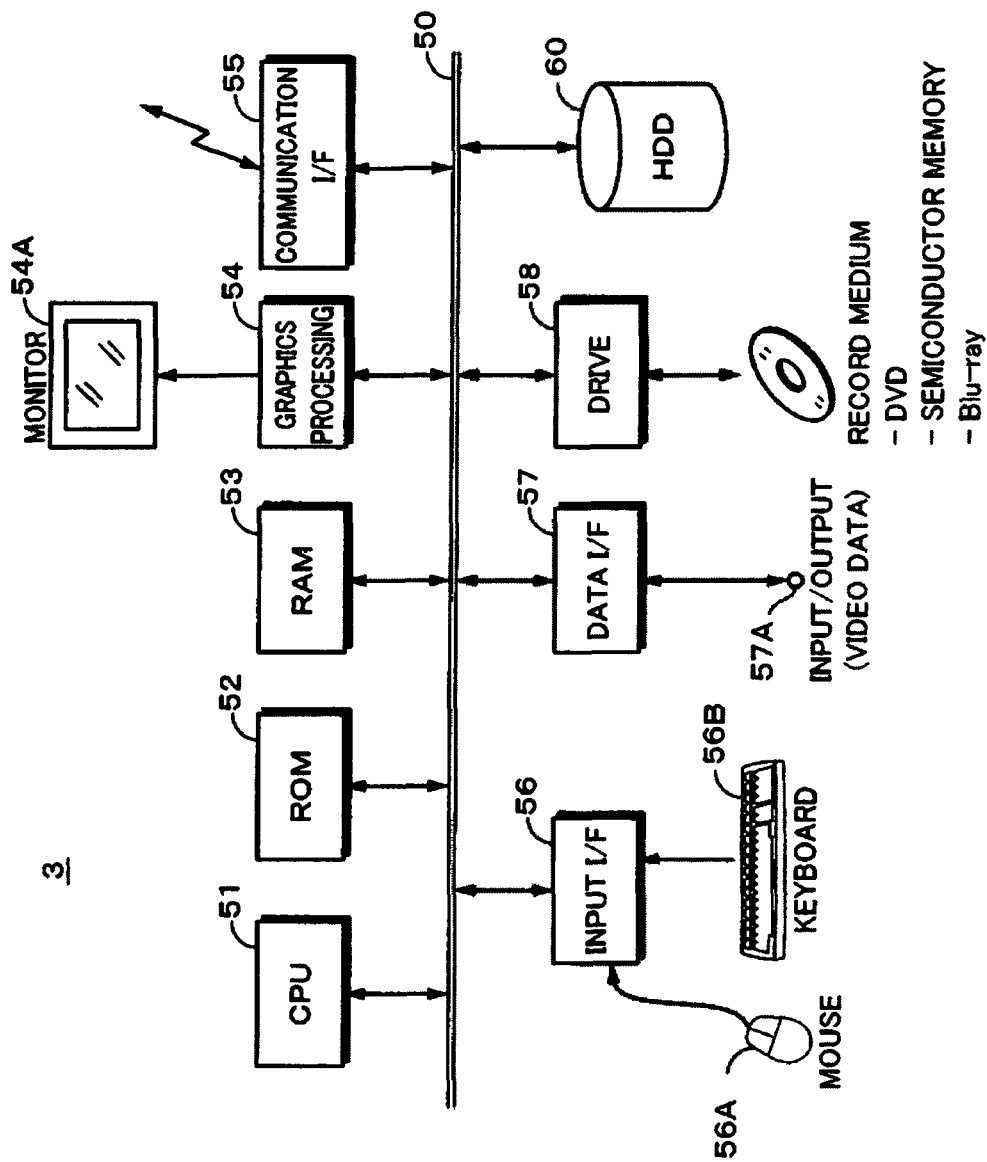
FIG. 17 is a block diagram showing an outline of an exemplary structure of a conventional computer apparatus.

FIG. 17 shows an outline of an exemplary structure of a conventional computer apparatus 3. Connected to a bus 50 are a CPU 51, a ROM 52, and a RAM 53. The CPU 51 communicates with and controls each section of the computer apparatus 3 through the bus 50 using the RAM 53 as a work memory according to a program and data stored in the ROM 52 and a hard disk 60 that will be described later.

Connected to the bus 50 are also a graphics processing section 54 and a communication interface (communication I/F) 55. Connected to the graphics processing section 54 is a monitor 54A. The graphics processing section 54 converts a display control signal supplied from the CPU 51 into a picture signal, supplies the picture signal to the monitor 54A, and causes the monitor 54A to display a predetermined picture. The communication I/F 55 is connected to a network, for example, the Internet or LAN (Local Area Network). The communication I/F 55 controls communications between the computer apparatus 3 and the outside through the network according to a command supplied from the communication I/F 55.

Connected to the bus 50 are also an input interface (input I/F) 56, a video interface (video I/F) 57, a drive device 58, and the hard disk drive 60.

Connected to the input I/F 56 are input devices that accept a user's input, for example, a pointing device, such as a mouse 56A, and a character input device, such as a keyboard 56B. Input devices connected to the input I/F 56 are not limited to such devices. It can be contemplated that input devices connected to the input I/F 56 are various types of devices such as a rotary encoder that outputs a control signal corresponding to a rotation angle, a joy stick that outputs a control signal corresponding to the direction and degree in and for which a stick is inclined, and a tablet that outputs a value corresponding to a designated position on a plane.

The data I/F 57 is an interface that exchanges digital data between the computer apparatus 3 and an external device and may be an interface such as USB (Universal Serial Bus) or IEEE 1394 (Institute Electrical and Electronics Engineers 1394). When an external device corresponding to the interface is connected to an input/output terminal 57A, data are exchanged between the external device and the data I/F 57 according to the protocol of the interface and data can communicate between the external device and the computer apparatus 3.

The drive device 58 handles, for example, a disc shaped record medium. Data can be written to and read from a recordable type record medium loaded into the drive device 58. An exemplary recordable type record medium is a recordable type DVD. Instead, the drive device 58 may handle a recordable type CD (Compact Disc) or a Blu-ray Disc. In addition, the drive device 58 can read data from a reproduction-only record medium, for example, a DVD-ROM, a CD-ROM (Compact Disc-Read Only Memory) as well as a recordable type record medium. The drive device 58 is not limited to a device that can handle a disc shaped record medium. Instead, the drive device 58 can handle a semiconductor memory such as a flash memory as a record medium 59.

As described above, the hard disk drive 60 stores a program and data that the CPU 51 uses. Of course, other data supplied through the bus 50 can be written to and read from the hard disk drive 60.

When an editing program that causes the computer apparatus 3 to execute the editing method according to an embodiment of the present invention is installed to such a computer apparatus 3, it can be operated as an editing apparatus for a video stream according to the AVCHD format. In other words, this editing program causes the CPU 51 to accomplish the functions of the video encoder 11, the multiplexer 12, the demultiplexer 32, the video decoder 33, and the editing section 40 of the editing apparatus 2 described with reference to FIG. 16. Since the load of the processes of the video encoder 11 is large, it may be discrete hardware connected to the bus 50 and controlled by the CPU 51.

The editing program is pre-recorded on a record medium such as CD-ROM or DVD-ROM and provided thereby. When the editing program has been recorded on DVD-ROM and it is loaded into the drive device 58, a program file that stores the editing program is read from DVD-ROM loaded into the drive device 58 under the control of the CPU 51. The editing program is read from the program file, mapped in a predetermined manner by the CPU 51, written to the hard disk drive 60, registered to the system, and caused to be executable on the computer apparatus 3.

The method of providing the editing program to the computer apparatus 3 is not limited to the method through a record medium. For example, the program file may be prepared in a server connected to the network and the program file may be obtained by the communication I/F 55 from the server through the network. Instead, the program file may be obtained through the data I/F 57.

Next, an exemplary process of causing the computer apparatus 3 into which the editing program has been installed in an executable manner to execute the editing program according to the embodiment of the present invention will be outlined. For example, the record medium 20 on which a stream file has been recorded by the recoding apparatus 1 shown in FIG. 15 is loaded into the drive device 58 and the stream file recorded on the record medium 20 is edited.

The record medium 20 on which the stream file has been recorded is loaded into the drive device 58 and the an edit command for the stream file recorded on the record medium 20 is issued by the user with the input device connected to the input I/F 56.

The CPU 51 controls the computer apparatus 3 to copy a stream file recorded on the record medium 20 to the hard disk drive 60. The CPU 51 reads the stream file from the hard disk drive 60, disassembles the stream file into packets using the RAM 53 as a work memory, collects predetermined information from the header of each packet, and reassembles a video elementary stream and an audio elementary stream. The elementary streams are written to the hard disk drive 60. In the following, only the elementary stream of video data will be described.

The CPU 51 reads an elementary stream from the hard disk drive 60, decodes the elementary stream, and obtains base band video data. The base band video data are supplied to the graphic processing section 54, converted into a picture signal thereby, and then displayed on the monitor 54A. While watching pictures displayed on the monitor 54A, the user designates edit point A and edit point B with frame numbers, time codes, or the like with the input device connected to the input I/F 56. Information of edit point A and edit point B is stored, for example, in the RAM 53.

When an edit execution command is issued with the input device, the CPU 51 starts performing the editing process for the elementary stream written in the hard disk drive 60. In other words, as described with reference to FIG. 9, the CPU 51 parses the NAL unit of the elementary stream written in the hard disk drive 60 and extracts SEI "User Data Unregistered SEI" from the elementary stream. Thereafter, the CPU 51 searches the extracted SEI "User Data Unregistered SEI" for the block ModifiedDVPackMeta( ) containing the data modified_dv_pack that represents information of the recording apparatus that has recorded the file that stores the elementary stream to be edited on the record medium 20 and also searches the block ModifiedDVPackmeta( ) for the block MAKER & MODEL ID pack ( ) based on the value of the field mpd_id (at step S10 shown in FIG. 9).

The information of SEI "User Data Unregistered SEI" in the stream file to be edited may obtained and stored in the RAM 53 when the stream file is reproduced to designate edit point A and edit point B.

The CPU 51 determines whether or not there are data of a model that can encode the elementary stream with the same attributes on the basis of the field maker_ID and the field maker_model_code stored in the searched block MAKER & MODEL ID pack ( ).

The information of a model that can encode the elementary stream with the same attributes as that of the editing program installed in this computer apparatus 3 is stored, for example, in a program file that stores the editing program. Instead, the information may be provided by a record medium on which the program file has been recorded. Instead, the information may be provided by an external server through the network.

When determined that there be data of a model that can encode the elementary stream with the same attributes, the editing process is performed on the basis of the technique of re-encoding only a necessarily minimum region at step S12 shown in FIG. 9.

As exemplified with reference to FIG. 10A, FIG. 10B, and FIG. 10C, the CPU 51 reads GOP #3 containing edit point A and GOP #2 immediately preceding GOP #3 from the elementary stream written in the hard disk drive 60. For example, while the editing section 40 is parsing the NAL unit of the elementary stream in a predetermined manner, the editing section 40 detects the positions of GOPs and reads desired GOPs. The CPU 51 decodes these GOP #2 and GOP #3 that have been read and writes them to the hard disk drive 60 or the RAM 53. The CPU 51 deletes the region after edit point A of the decoded GOP #3 written in the hard disk drive 60 or the RAM 53. Likewise, the CPU 51 reads GOP #7 containing edit point B and GOP #8 immediately following GOP #7 from the elementary stream written in the hard disk drive 60, decodes these GOPs, and writes the decoded GOPs to the hard disk drive 60 or the RAM 53. The CPU 51 deletes the region from the front end to edit point B of the decoded GOP #7 written in the hard disk drive 60 or the RAM 53.

Thereafter, the CPU 51 connects the GOP #3 from which the region after edit point A has been deleted and the GOP #7 from which the region from the front end to edit point B has been deleted on the hard disk drive 60 or the RAM 53 and creates GOP #3+7 as a new GOP. When the GOPs are connected, if the number of picture contained in the connected GOP does not become the predetermined number of pictures, interpolation, decimation, or the like is performed for the pictures such that the number of pictures contained in the connected GOP becomes the predetermined number of pictures.

The CPU 51 re-encodes GOP #2, GOP #3+7, and GOP #8 written in the hard disk drive 60 or the RAM 53 and writes the re-encoded GOPs to the hard disk drive 60. At this point, the pre-decoded GOP #2 that has been written to the hard disk drive 60 or the RAM 53 first can be overwritten to the re-encoded GOP #2 written in the hard disk drive 60. By successively and continuously reading the re-encoded GOP #1, GOP #2, GOP #3+7, GOP #8, and GOP #9 from the hard disk drive 60, the CPU 51 can output one elementary stream.

When the storage amount information of the foregoing buffer has been described in the elementary stream to be edited, the CPU 51 controls the code amount to be generated on the basis of the storage amount information in a predetermined manner and encodes GOPs.

In contrast, when determined that there be no data of a model that can encode the elementary stream with the same attributes based on the information of block MAKER & MODEL ID pack ( ) of the block ModifiedDVPackMeta( ) in SEI "User Data Unregistered SEI" at step S11 shown in FIG. 9, the editing process is performed on the basis of the technique of re-encoding all the region of the video stream to be edited at step S13 shown in FIG. 9.

As exemplified with reference to FIG. 11A and FIG. 11B, the CPU 51 reads an elementary stream from the hard disk drive 60 in which the elementary stream has been written and decodes the elementary stream. The decoded data are written to the hard disk drive 60. When the capacity of the RAM 53 is sufficiently large, the decoded data may be written to the RAM 53.

The CPU 51 deletes the region from edit point A to edit point B of the decoded video data in the unit of one frame and connects edit point A and edit point B. At this point, if the number of pictures contained in the GOP containing the connection portion does not become the predetermined number of pictures, the CPU 51 performs interpolation, decimation, or the like for pictures such that the number of pictures contained in the GOP becomes the predetermined number of pictures. The CPU 51 re-encodes the video data of which edit point A and edit point B have been connected for all the length and creates one elementary stream. The elementary stream is written to the hard disk drive 60.

Since the process of setting edit point A and edit point B for two stream files, editing these stream files, and obtaining one data stream is the same as the process of setting edit point A and edit point B for one stream file and editing the stream file, the description of the process will be omitted.

The elementary stream for which the editing process has been performed and that has been written to the hard disk drive 60 is packetized as PES packets, TS packets, and source packets and then obtained as a transport stream according to the MPEG2 systems by the CPU 51. The data stream is supplied to the drive device 58 and then recorded on the record medium.

The elementary stream as the edited result may be stored, for example, in the drive device 58, as well as written to the record medium loaded into the drive device 58. Instead, the elementary stream may be read from the hard disk drive 60 and output to an external device through the data I/F 57. Instead, the elementary stream may be transmitted from the communication I/F 55 to the outside through the network. Instead, the elementary stream as the edited result may be packetized as a transport stream in a predetermined manner, stored in the hard disk drive 60, output to an external device through the data I/F 57, and transmitted from the communication I/F 55 to the outside through the network.

Video data to be edited are not only video data that are read from the record medium loaded into the drive device 58, but also video data supplied from the outside. For example, video data to be edited are input from the input/output terminal 57A and written to the hard disk drive 60 through the data I/F 57. The CPU 51 performs the editing process for video data written in the hard disk drive 60 in the same manner as described above.

In the foregoing description, when the editing process is performed, the video decoder 33 can decode an input elementary stream. This operation is just exemplary. In other words, the video decoder 33 cannot always decode all streams prescribed in the format. Thus, for example, when determined that there be no data of a model that can encode the elementary stream with the same attributes at step S11 shown in FIG. 9, there is a possibility of which the video decoder 33 cannot decode an elementary stream that is input thereto.

In this case, it can be contemplated that one of the following two methods is performed. In the first method, when determined that there be no data of a model that can encode with the same attributes at step S11 shown in FIG. 9, the elementary stream is input to the video decoder 33. The video decoder 33 performs a decoding process for the elementary stream. If an error occurs in the video decoder 33, it is determined that the elementary stream has failed to be decoded. In this case, it is preferred that predetermined display means inform the user that the elementary stream has failed to be decoded.

In the second method, attribute information of the elementary stream is used. For example, in the AVCHD format, an attribute information file that stores attribute information that represents the attributes of the video stream is created for a stream file that stores a video stream of which the elementary stream has been packetized and the attribute information file is recorded to a record medium on which the stream file is recorded. The attribute information file describes the number of corresponding streams and parameters with respect to encoding for the corresponding streams.

Thus, when the editing process is performed, the parameters with respect to the encoding are extracted from the attribute information file and it is determined whether or not the elementary stream can be decoded on the basis of the parameters. When determined that the elementary stream be not able to be decoded, the decoding process is cancelled. At this point, it is preferred that predetermined display means or the like inform the user that the elementary stream cannot be decoded. In contrast, when determined that the elementary stream be able to be decoded on the basis of the parameters, the elementary stream is input to the video decoder 33 and it starts decoding the elementary stream. After decoding for the elementary stream is started, like the foregoing first method, if an error occurs in the video decoder 33, it is determined that the elementary stream have failed to be decoded.

DESCRIPTION OF REFERENCE NUMERALS

1 Recoding apparatus
2 Editing apparatus
3 Computer apparatus
11 Video encoder
12 Multiplexer
13 Stream buffer
14 Recording processing section
20 Record medium
30 Reproducing processing section
31 Stream buffer
32 Demultiplexer
33 Video decoder
40 Editing section
41 UI section
42 Hard disk drive
51 CPU
52 ROM
53 RAM
58 Drive device
60 Hard disk drive
S10 Search stream file to be edited for maker & model ID pack of modified DV pack.
S11 Is there data of model that can encode video stream with same attributes?
S12 Perform editing process based on technique of re-encoding necessarily minimum region.
S13 Perform editing process based on technique of re-encoding all region.

The invention claimed is:

1. In an editing apparatus which edits video data which have been compression-encoded using inter-frame compression, characterized in that the editing apparatus comprises:
an input section to which a data stream composed of the video data that have been compression-encoded using the inter-frame compression is input;
an extracting section which extracts identification information from the data stream, the identification information identifying a device which has created the data stream;
a decoding section which decodes the data stream;
an encoding section which encodes the video data with a predetermined attribute according to compression-encoding using the inter-frame compression; and
an editing section which decodes and encodes the data stream based on an edit point that has been set to the data stream and edits the data stream based on the edit point, and
the editing section determines whether or not the identification information extracted from the stream data by the extracting section represents a device which can encode the video data with an attribute identical to the predetermined attribute with which the encoding section encodes the data stream and when determined that the identification information represent the device, the editing section decodes and encodes a predetermined region including the edit point and edits the predetermined region.

2. In the editing apparatus as set forth in claim 1, characterized in that when the editing section has determined that the identification information extracted from the stream data by the extracting section do not represents the device that can encode the video data with the attribute identical to the predetermined attribute with which the encoding section encodes the video data, the editing section encodes and decodes all the data stream and edits it.

3. In the editing apparatus as set forth in claim 1, characterized in that
the identification information is composed of information which identifies a maker of the device and information which identifies a model name or a model number of the device.

4. In the editing apparatus as set forth in claim 1, characterized in that
the attribute includes a frame size, an aspect ratio, a frame rate, and a frame structure of the video data and presence or absence of closed caption information.

5. The editing apparatus as set forth in claim 1, characterized in that
the extracting section also extracts buffer storage amount information from the stream data when the stream data are decoded and the encoding section encodes the video data based on the buffer storage amount information extracted by the extracting section.

6. In an editing method of editing video data which have been compression-encoded using inter-frame compression, characterized in that
the editing method comprises:
an extracting step of extracting identification information from a data stream composed of video data that have been compression-encoded using the inter-frame compression, the identification information identifying a device which has created the data stream;
a decoding step of decoding the data stream;
an encoding step of encoding the video data with a predetermined attribute according to compression-encoding using the inter-frame compression; and
an editing step of decoding and encoding the data stream based on an edit point that has been set to the data stream and editing the data stream based on the edit point, and
the editing step is performed by determining whether or not the identification information extracted from the stream data by the extracting section represents a device which can encode the video data with an attribute identical to the predetermined attribute with which the data stream is encoded at the encoding step and when determined that the identification information represent the device, the editing step is performed by decoding and encoding a predetermined region including the edit point and editing the predetermined region based on the edit point.

7. In a non-transitory computer readable record medium having stored thereon an editing program which causes a computer apparatus to execute an editing method of editing video data which have been compression-encoded using inter-frame compression, characterized in that
the editing method comprises:
an extracting step of extracting identification information from a data stream composed of video data that have been compression-encoded using the inter-frame compression, the identification information identifying a device which has created the data stream;
a decoding step of decoding the data stream;
an encoding step of encoding the video data with a predetermined attribute according to compression-encoding using the inter-frame compression; and
an editing step of decoding and encoding the data stream based on an edit point that has been set to the data stream and editing the data stream based on the edit point, and
the editing step is performed by determining whether or not the identification information extracted from the stream data by the extracting section represents a device which can encode the video data with an attribute identical to the predetermined attribute with which the data stream is encoded at the encoding step and when determined that the identification information represent the device, the editing step is performed by decoding and encoding a predetermined region including the edit point and editing the predetermined region based on the edit point.

8. In an editing system which compression-encodes video data using inter-frame compression, records the encoded video data to a record medium, and edits video data that have been compression-encoded using the inter-frame compression and that have been reproduced from the record medium, characterized in that
the editing system comprises:
a recording apparatus which has:
a first encoding section which compression-encodes the video data using the inter-frame compression with a predetermined attribute and outputs the encoded video data as a data stream; and
a recoding section which records the data stream which is output from the first encoding section as a stream file to the record medium,
the recording apparatus recording the data stream to the record medium such that identification information which identifies a device is embedded in the data stream, and
an editing apparatus which has:
a reproducing section which reads the stream file from the record medium and extracts the data stream from the stream file;
an extracting section which extracts the identification information from the data stream;
a decoding section which decodes the data stream;
a second encoding section which encodes the video data according to compression encoding using the inter-frame compression with a predetermined attribute; and
an editing section which decodes and encodes the data stream based on an edit point that has been set to the data stream and edits the predetermined region based on the edit point,
the editing section determining whether or not the identification information extracted from the stream data by the extracting section represents a device that can encode the video data with an attribute identical to the predetermined attribute with which the second encoding section encodes the video data and when determined that the identification information represent the device, the editing section decodes and encodes a predetermined region including the edit point and edits the predetermined region based on the edit point.

* * * * *

UNITED STATES PATENT AND TRADEMARK OFFICE
CERTIFICATE OF CORRECTION

PATENT NO. : 8,189,665 B2  
APPLICATION NO. : 12/083180  
DATED : May 29, 2012  
INVENTOR(S) : Naoki Morimoto et al.

Page 1 of 1

It is certified that error appears in the above-identified patent and that said Letters Patent is hereby corrected as shown below:

On the face of the patent, "(22) PCT Filed: Sep. 8, 2007" should read --(22) PCT Filed: Aug. 8, 2007--.

Signed and Sealed this  
Twenty-sixth Day of June, 2012

David J. Kappos  
*Director of the United States Patent and Trademark Office*